US008780202B2

(12) United States Patent
Yamada et al.

(10) Patent No.: US 8,780,202 B2
(45) Date of Patent: Jul. 15, 2014

(54) IMAGE GENERATION APPARATUS

(75) Inventors: Masahiro Yamada, Kobe (JP); Azusa Matsuoka, Kobe (JP); Susumu Taniguchi, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 578 days.

(21) Appl. No.: 13/032,946

(22) Filed: Feb. 23, 2011

(65) Prior Publication Data
US 2011/0234801 A1 Sep. 29, 2011

(30) Foreign Application Priority Data

Mar. 25, 2010 (JP) .................................. 2010-070312

(51) Int. Cl.
*B60R 1/00* (2006.01)
*H04N 5/247* (2006.01)
*H04N 7/18* (2006.01)
*H04N 5/262* (2006.01)
*H04N 5/232* (2006.01)

(52) U.S. Cl.
CPC *B60R 1/00* (2013.01); *H04N 5/247* (2013.01); *B60R 2300/103* (2013.01); *B60R 2300/304* (2013.01); *H04N 7/181* (2013.01); *H04N 5/2624* (2013.01); *H04N 5/23293* (2013.01); *B60R 2300/60* (2013.01); *B60R 2300/105* (2013.01)
USPC ............ 348/148; 348/159; 382/104; 382/165

(58) Field of Classification Search
CPC .......... B60R 1/00; B60R 2300/103–2300/105; H04N 5/23293; H04N 7/181
See application file for complete search history.

(56) References Cited

U.S. PATENT DOCUMENTS

| 7,663,476 | B2 * | 2/2010 | Watanabe et al. | 340/435 |
| 8,452,056 | B2 * | 5/2013 | Muramatsu et al. | 382/104 |
| 2004/0114796 | A1 * | 6/2004 | Kaku | 382/165 |
| 2006/0033820 | A1 | 2/2006 | Honda et al. | |
| 2006/0088190 | A1 * | 4/2006 | Chinomi | 382/104 |

(Continued)

FOREIGN PATENT DOCUMENTS

| JP | A-11-308609 | 11/1999 |
| JP | A-2002-240629 | 8/2002 |

(Continued)

OTHER PUBLICATIONS

Mar. 1, 2013 Office Action issued in Chinese Patent Application No. 201110038128.3 (with translation).

(Continued)

*Primary Examiner* — Joseph Ustaris
*Assistant Examiner* — Maryam Nasri
(74) *Attorney, Agent, or Firm* — Oliff PLC

(57) ABSTRACT

An image display system is capable of generating a composite image that shows a surrounding area of a vehicle viewed from virtual viewpoints, by combining a plurality of shot images taken by a plurality of on-vehicle cameras that are disposed at different locations on the vehicle. The image display system changes data volumes of two shot images taken by two of the on-vehicle cameras based on a lighting mode of a lighting apparatus, the data volumes being used for an overlap area of the composite image that corresponds to the surrounding area of the vehicle where the two on-vehicle cameras can shoot in overlap. This reduces problems caused by lighting of the lighting apparatus in the overlap area of the composite image.

9 Claims, 14 Drawing Sheets

(56) References Cited

U.S. PATENT DOCUMENTS

| | | |
|---|---|---|
| 2007/0268118 A1 | 11/2007 | Watanabe et al. |
| 2009/0009604 A1* | 1/2009 | Kanaoka et al. ............. 348/148 |
| 2009/0273941 A1* | 11/2009 | Englander et al. ............ 362/464 |
| 2011/0285848 A1* | 11/2011 | Han et al. ...................... 348/148 |

FOREIGN PATENT DOCUMENTS

| | | |
|---|---|---|
| JP | A-2002-354468 | 12/2002 |
| JP | A-2006-121587 | 5/2006 |
| JP | A-2006-287513 | 10/2006 |
| JP | A-2007-036668 | 2/2007 |
| JP | A-2008-195258 | 8/2008 |
| JP | A-2008-306546 | 12/2008 |
| JP | A-2009-141490 | 6/2009 |
| JP | A-2011-49735 | 3/2011 |

OTHER PUBLICATIONS

U.S. Appl. No. 13/048,326.
Apr. 24, 2013 Office Action in U.S. Appl. No. 13/048,326.
Aug. 19, 2013 Office Action in U.S. Appl. No. 13/048,326.
Japanese Office Action issued in Japanese Patent Application No. 2010-080716 dated Nov. 19, 2013 (w/ partial translation).
U.S. Office Action issued in U.S. Appl. No. 13/048,326 dated Dec. 6, 2013.
Notice of Rejection issued in Japanese Patent Application No. 2010-070312 dated Jan. 7, 2014 (w/ partial translation).

* cited by examiner

IMAGE GENERATION APPARATUS

BACKGROUND OF THE INVENTION

1. Field of the Invention

The invention relates to an image generation technology of an image for display on a display apparatus that is installed in a vehicle.

2. Description of the Background Art

Conventionally, an image display system that is installed in a vehicle and that displays, on an in-vehicle display, images of surrounding area taken by on-vehicle cameras is known. A driver can view a surrounding area of a vehicle in almost real time by using this image display system.

In an example, the area outside of the front fender on the opposite side of a driver's seat becomes a blind area for a driver, and the driver hardly recognizes clearances between own vehicle and obstacles in the area. On the other hand, using the image display system, images of the area outside of the front fender are taken by on-vehicle cameras and are displayed on a vehicle-cabin display. This system helps a driver to recognize easily clearances between a vehicle body and obstacles in the area on the opposite side of the driver's seat in a case like when approaching to a roadside.

These days, a new image display system is proposed. The new system generates composite images which show a surrounding area of a vehicle using plural images taken by plural on-vehicle cameras that are installed at different locations on the vehicle, and which are displayed in a manner viewed from virtual viewpoints e.g. from just above of the vehicle.

In an example of the image display system that generates composite images viewed from a virtual viewpoint, composite images are generated using four images taken by four on-vehicle cameras installed respectively on a vehicle, at the front, at the left side, at the right side, and at the rear of the vehicle. If composite images are generated by the method where the four shot images are connected simply at the prescribed boundaries, the generated object images lack continuity in the boundary areas between two adjacent shot images. Thus, it is difficult to recognize the objects existing in the boundary areas or passing through the areas.

To solve this problem, overlapped areas made by the areas shot by two adjacent on-vehicle cameras are provided. As a new proposed method, the images taken by two adjacent on-vehicle cameras are blended at a prescribed proportion for generating a composite image in a boundary area. This method reduces discontinuity of object images appeared on object images in the boundary area of two shot images and makes it easier to recognize the objects existing in the boundary area.

Generally, plural on-vehicle cameras that are used for generating composite images implement exposure control respectively.

In the case where headlights of a vehicle are on e.g. at night time because of darkness of surrounding area of the vehicle, an on-vehicle camera installed at the front of the vehicle (hereinafter referred to as a front on-vehicle camera) implements exposure control based on the relatively bright area that is lightened by headlights. On the other hand, an on-vehicle camera installed at the side of the vehicle (hereinafter referred to as a side on-vehicle camera) implements exposure control based on a very dark area with no lighting. Thus, the exposure controls quite different between the side on-vehicle camera and the front on-vehicle camera are implemented. The side on-vehicle camera implements exposure control to make images much brighter compared to the front on-vehicle camera. Thus, brightness of one object image existing in the overlap area becomes quite different between images taken by the front on-vehicle camera and by the side on-vehicle camera.

Therefore, two images of one object quite different in brightness are blended when two shot images in overlap area corresponding to the images taken by the front on-vehicle camera and by the side on-vehicle camera are blended to generate a composite image in overlap area (boundary area of two shot images). As a result, defects (such as whiteout and color migration) of the composite image in the overlap area occur, and visibility level of an object image in the overlap area is extremely deteriorated.

SUMMARY OF THE INVENTION

According to one aspect of the invention, an image generation apparatus generates an image for display on a display installed in a vehicle. The image generation apparatus includes an image generator that generates a composite image showing a surrounding area of the vehicle viewed from virtual viewpoints, by combining a plurality of shot images taken by a plurality of on-vehicle cameras that are disposed at different locations on the vehicle, a receiver that receives a signal indicating a lighting mode of a lighting apparatus included in the vehicle, and a controller that changes data volumes of two shot images taken by two of the on-vehicle cameras based on the lighting mode of the lighting apparatus, the data volumes being used in an overlap area of the composite image that corresponds to the surrounding area of the vehicle where the two on-vehicle cameras can shoot in overlap.

Since the image generation apparatus changes two data volumes of the two shot images used in the overlap area of the composite image based on the lighting mode of the lighting apparatus, problems in the overlap area of the composite image caused by lighting of the lighting apparatus can be reduced.

According to another aspect of the invention, the controller increases the data volume of the shot image taken by a first on-vehicle camera of the two on-vehicle cameras whose optical axis heads toward an area that is lighted by the lighting apparatus, and decreases the data volume of the shot image taken by a second on-vehicle camera of the two on-vehicle cameras, in a case where the lighting apparatus is on, as compared to a case where the lighting apparatus is off.

Since the image generation apparatus increases the data volume of the shot image having proper brightness taken by the first on-vehicle camera, and decreases the data volume of the shot image taken by the second on-vehicle camera, problems occurring in the overlap area of the composite image can be effectively reduced.

According to another aspect of the invention, the controller expands the area that uses the shot image taken by the first on-vehicle camera in the overlap area of the composite image, and narrows the area that uses the shot image taken by the second on-vehicle camera in the overlap area of the composite image, in the case where the lighting apparatus is on, as compared to the case where the lighting apparatus is off.

Since the image generation apparatus expands the area that uses the shot image which has proper brightness and is taken by the first on-vehicle camera, and narrows the area that uses the shot image taken by the second on-vehicle camera, problems occurring in the overlap area of the composite image can be effectively reduced.

Therefore, the object of the invention is to reduce problems on a composite image caused by lighting of a lighting apparatus.

BRIEF DESCRIPTION OF THE DRAWINGS

FIG. 7 is a figure showing a lighting mode with headlights on.

FIG. 8 is a figure showing a lighting mode with brake lights on.

FIG. 9 is a figure describing a method for deriving pixel values in overlap areas in a case where headlights are on.

FIG. 10 is a figure describing a method for deriving pixel values in overlap areas in a case where brake lights are on.

FIG. 11 is a figure describing a method for deriving pixel values in overlap areas in a case where headlights and brake lights are on.

DESCRIPTION OF THE EMBODIMENTS

Hereinafter, an embodiment of the invention is described with reference to attached drawings.

1. First Embodiment

<1-1. System Configuration>

Figure 1:
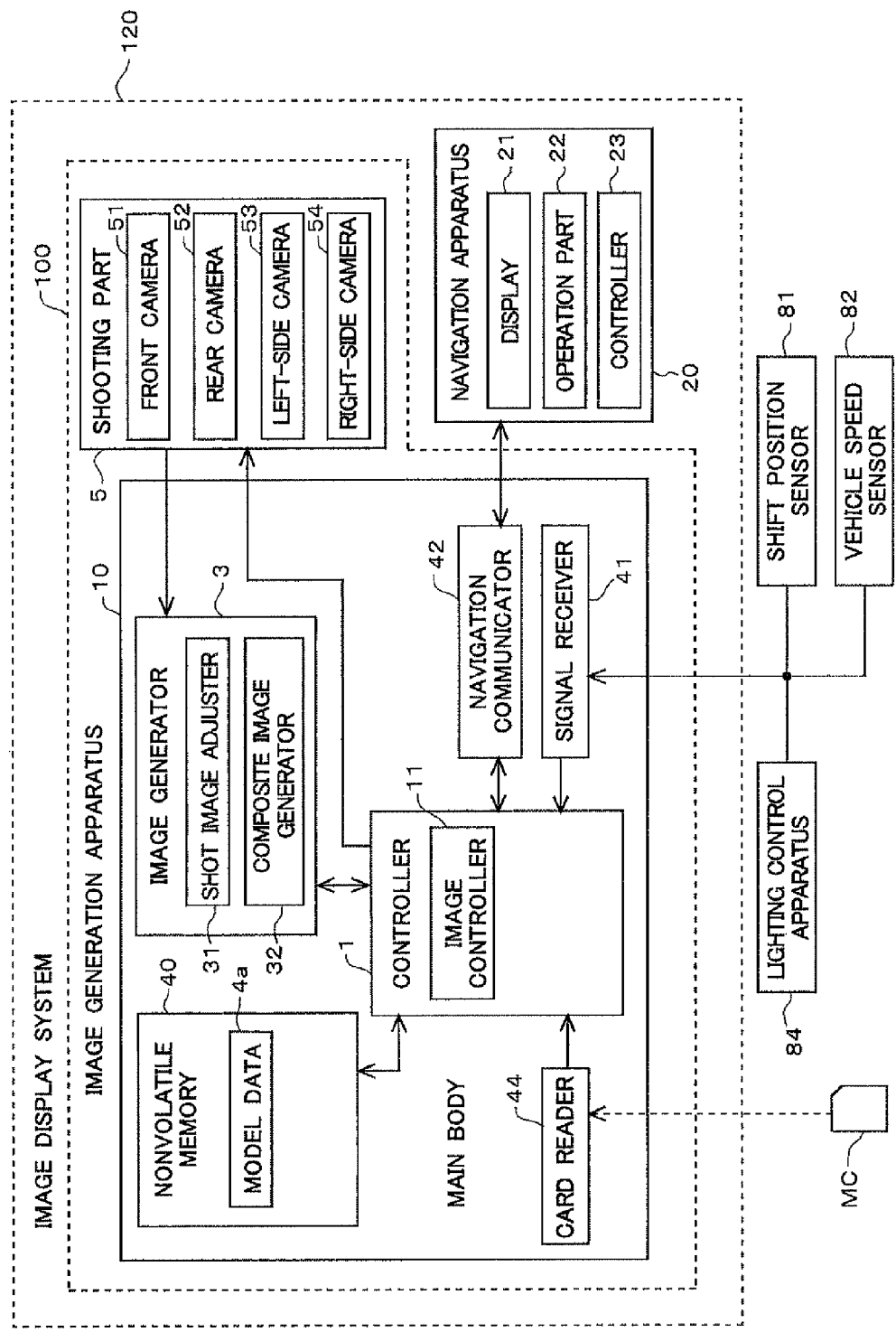
FIG. 1 is a block diagram showing a configuration of an image display system.

FIG. 1 is a block diagram showing a configuration of the first embodiment of an image display system 120. This image display system 120 is to be installed in a vehicle (a car in this embodiment) and has a function that shoots a surrounding area of a vehicle, and displays the generated images on a display disposed in a vehicle cabin. A user (typically a driver) of the image display system 120 can recognize the surrounding area of the vehicle in almost real time by using the image display system 120.

As shown in FIG. 1, the image display system 120 mainly includes an image generation apparatus 100 that generates images showing a surrounding area of a vehicle, and a navigation apparatus 20 that displays a variety of information to a user on a vehicle. The images generated by the image generation apparatus 100 are displayed on the navigation apparatus 20.

The navigation apparatus 20 that provides navigation assistance to a user includes a display 21 such as a liquid crystal display having a touch-screen function, an operation part 22 that a user operates, and a controller 23 that controls the whole apparatus. The navigation apparatus 20 is installed in, for example, an instrument panel of a vehicle so that the screen of the display 21 can be visible from a user. Various kinds of instructions of a user are accepted by the operation part 22 or the display 21 having a touch-screen function. The controller 23 is a computer having CPU, RAM, ROM, etc. Various kinds of functions including a navigation function of the controller 23 are implemented by CPU processing according to a predetermined program.

The navigation apparatus 20 that is connected to the image generation apparatus 100 is capable of transmitting and receiving various kinds of control signals between the image generation apparatus 100, and is capable of receiving images generated by the image generation apparatus 100. The display 21 normally displays images based on a stand-alone function of the navigation apparatus 20. Under predetermined conditions by the control of the controller 23, the display 21 displays the images of a surrounding area of a vehicle, which are generated by the image generation apparatus 100. Here, the navigation apparatus 20 functions also as a display apparatus that receives and displays the images generated by the image generation apparatus 100.

The image generation apparatus 100 includes a main body 10 which is an ECU (Electronic Control Unit) having a function of generating images. The main body 10 is disposed at a predetermined location of a vehicle. The image generation apparatus 100 has a shooting part 5 that shoots a surrounding area of a vehicle, and generates composite images viewed from a virtual viewpoint based on the shot images of a surrounding area of a vehicle, which are taken by the shooting part 5.

The shooting part 5 that is electrically connected to the main body 10 operates based on the signals from the main body 10. The shooting part 5 has plural on-vehicle cameras; a front camera 51, a rear camera 52, a left-side camera 53 and a right-side camera 54. Each of the on-vehicle cameras 51, 52, 53 and 54 that has a lens and an image sensor acquires images electronically.

Moreover, each of the on-vehicle cameras 51, 52, 53 and 54 implements exposure control, so that an image of an object located in its optical axis direction is displayed as a shot image having proper brightness based on the brightness of the area in its optical axis direction. In an example, when it is relatively bright in the area of an optical axis direction, exposure control for darkening shot images is implemented. The concrete contents of the exposure control are, for example, reducing of diaphragm aperture, shortening of exposure time, and reducing of gains in automatic gain control. On the contrary, when it is relatively dark in the area of an optical axis direction, exposure control for brightening shot images is implemented. The concrete contents of the exposure control are, for example, increasing of the diaphragm aperture, lengthening of exposure time, and increasing of gains in automatic gain control. Such exposure control is implemented independently at each of the on-vehicle cameras 51, 52, 53 and 54.

Figure 2:
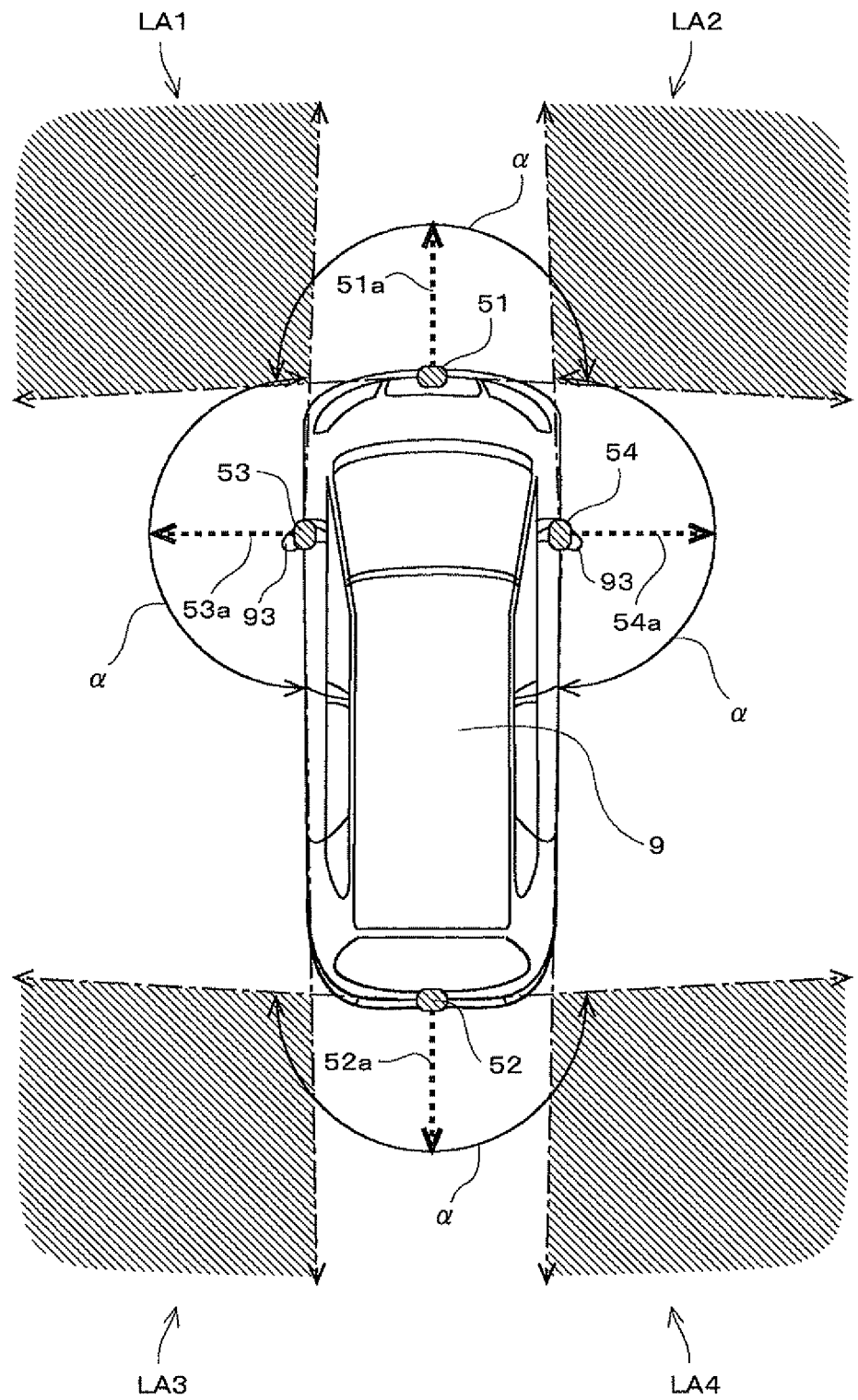
FIG. 2 is a figure showing locations where on-vehicle cameras are disposed on a vehicle.

These on-vehicle cameras 51, 52, 53, and 54 are respectively installed at different locations. FIG. 2 is a figure showing the locations where the on-vehicle cameras 51, 52, 53 and 54 are disposed on a vehicle.

As shown in FIG. 2, the front camera 51 is disposed at the location near a license plate at the front end of a vehicle 9, and an optical axis 51a of the front camera 51 heads straightly to a forward direction. The rear camera 52 is disposed at the location near a license plate at the rear end of the vehicle 9, and an optical axis 52a of the rear camera 52 heads straightly to a backward direction. It is desirable to dispose the front camera 51 and the rear camera 52 at the approximate centers between the left and the right sides, however it is also acceptable to dispose them at somewhat left or right from these centers.

The left-side camera 53 is disposed at a door mirror 93 on the left side, and an optical axis 53a of the left-side camera 53 heads toward a left direction (a direction perpendicular to a forward direction) along the left-right axis of the vehicle 9. The right-side camera 54 is disposed at a door mirror 93 of the right side, and an optical axis 54a of the right-side camera 54 heads toward a right direction along the left-right axis of the vehicle 9.

Each of the on-vehicle cameras 51, 52, 53 and 54 adopts a lens such as a fish-eye lens having a field angle α that is 180 degrees or more. Therefore, it is possible to shoot an entire perimeter of the vehicle 9 by using these four on-vehicle cameras 51, 52, 53 and 54. Areas LA1, LA2, LA3 and LA4 of hatched areas in FIG. 2 are the overlapped areas around the vehicle 9, which areas are shot by the adjacent two on-vehicle cameras in overlap. Concretely, the area LA1, front left of the vehicle 9, is an overlap area which is shot by the front camera 51 and the left-side camera 53 in overlap. The area LA2, front right of the vehicle 9, is an overlap area which is shot by the front camera 51 and the right-side camera 54 in overlap. The area LA3, rear left of the vehicle 9, is an overlap area which is shot by the rear camera 52 and the left-side camera 53 in overlap. The area LA4, rear right of the vehicle 9, is an overlap area which is shot by the rear camera 52 and the right-side camera 54 in overlap.

Back to FIG. 1, the main body 10 in the image generation apparatus 100 mainly includes a controller 1 that controls the entire apparatus, an image generator 3 that generates an image for display by processing an image shot by the shooting part 5, and a navigation communicator 42 that communicates with the navigation apparatus 20.

Various kinds of instructions from a user which are accepted by the operation part 22 or the display 21 of the navigation apparatus 20 are received by the navigation communicator 42 as control signals, and are input into the controller 1. Thus, the image generation apparatus 100 can operate in accordance with the operations done to the navigation apparatus 20 by a user.

The image generator 3 is, for example, hardware circuit capable of processing various kinds of images, and has a shot image adjuster 31 and a composite image generator 32 as main functions.

The shot image adjuster 31 adjusts, for utilizing for display, shot images taken by the shooting part 5. Concretely, the shot image adjuster 31 implements image processing of distortion correction, scaling, clipping, etc. for a shot image.

The composite image generator 32 generates a composite image that shows at least a part of a surrounding area of a vehicle viewed from an arbitrary virtual viewpoint around the vehicle based on the plural shot images taken by plural cameras of the on-vehicle cameras 51, 52, 53 and 54 of the shooting part 5. The method for generating a composite image by the composite image generator 32 is described later.

The shot images adjusted by the shot image adjuster 31 and a composite image generated by the composite image generator 32 are both further adjusted for display. Then, these images are output by the navigation communicator 42 to the navigation apparatus 20. The output images as subjects including the surrounding area of a vehicle are displayed on the display 21 of the navigation apparatus 20.

The controller 1 is, for example, a computer having CPU, RAM, ROM, etc. The controller 1 implements various kinds of control functions by CPU processing according to a prescribed program. The function of an image controller 11 shown in FIG. 1 is a part of functions of the controller 1.

The image controller 11 controls the image processing that the image generator 3 implements. In an example, the image controller 11 directs various parameters and others which are required by the composite image generator 32 for generating composite images.

The main body 10 of the image generation apparatus 100 further includes a nonvolatile memory 40, a card reader 44 and a signal receiver 41, which are respectively connected to the controller 1.

The nonvolatile memory 40 is, for example, flash memory capable of maintaining memory contents even in power-off state. The nonvolatile memory 40 stores model data 4a and other data. The model data 4a is the data corresponding to a vehicle model, which is required by the composite image generator 32 when generating composite images.

The card reader 44 reads data from a memory card MC that is a portable memory medium. The card reader 44 includes a card slot in which the memory card MC is inserted and extracted, and reads data of the memory card MC inserted in the card slot. The data read by the card reader 44 are input into the controller 1.

The memory card MC has flash memory or others that is capable of storing various data. The image generation apparatus 100 is capable of utilizing the various data stored in the memory card MC. In an example, by reading out a program stored in the memory card MC, the program (firmware) that implements a function of the controller 1 can be updated. It is also possible to make the image display system 120 apply to a different vehicle model; by storing in the memory card MC another model data different from the model data 4a stored in the nonvolatile memory 40, by reading out data of the memory card MC, and by storing another model data in the nonvolatile memory 40.

The signal receiver 41 receives signals from various apparatuses installed in a vehicle. Via this signal receiver 41, signals from the outside of the image display system 120 are input into the controller 1. Specifically, the signal receiver 41 receives signals that indicate various information transmitted from a shift position sensor 81, a vehicle speed sensor 82, a lighting control apparatus 84, etc., and inputs them into the controller 1.

The shift position sensor 81 transmits signals that indicate the shift lever positions of a transmission, such as "P (Parking)," "D (Driving)," "N (Neutral)" and "R (Reverse)." The vehicle speed sensor 82 transmits signals that indicate driving speeds (km/h) of the vehicle 9 at the time.

The lighting control apparatus 84 controls lighting apparatuses such as headlights and brake lights used normally in driving, which are installed on a standard vehicle. The lighting control apparatus 84 lights the headlights in accordance with a driver's operation and lights the brake lights when a driver presses on a brake. The lighting control apparatus 84 transmits signals that indicate lighting modes of such lighting apparatuses.

<1-2. Operation Mode>

Figure 3:
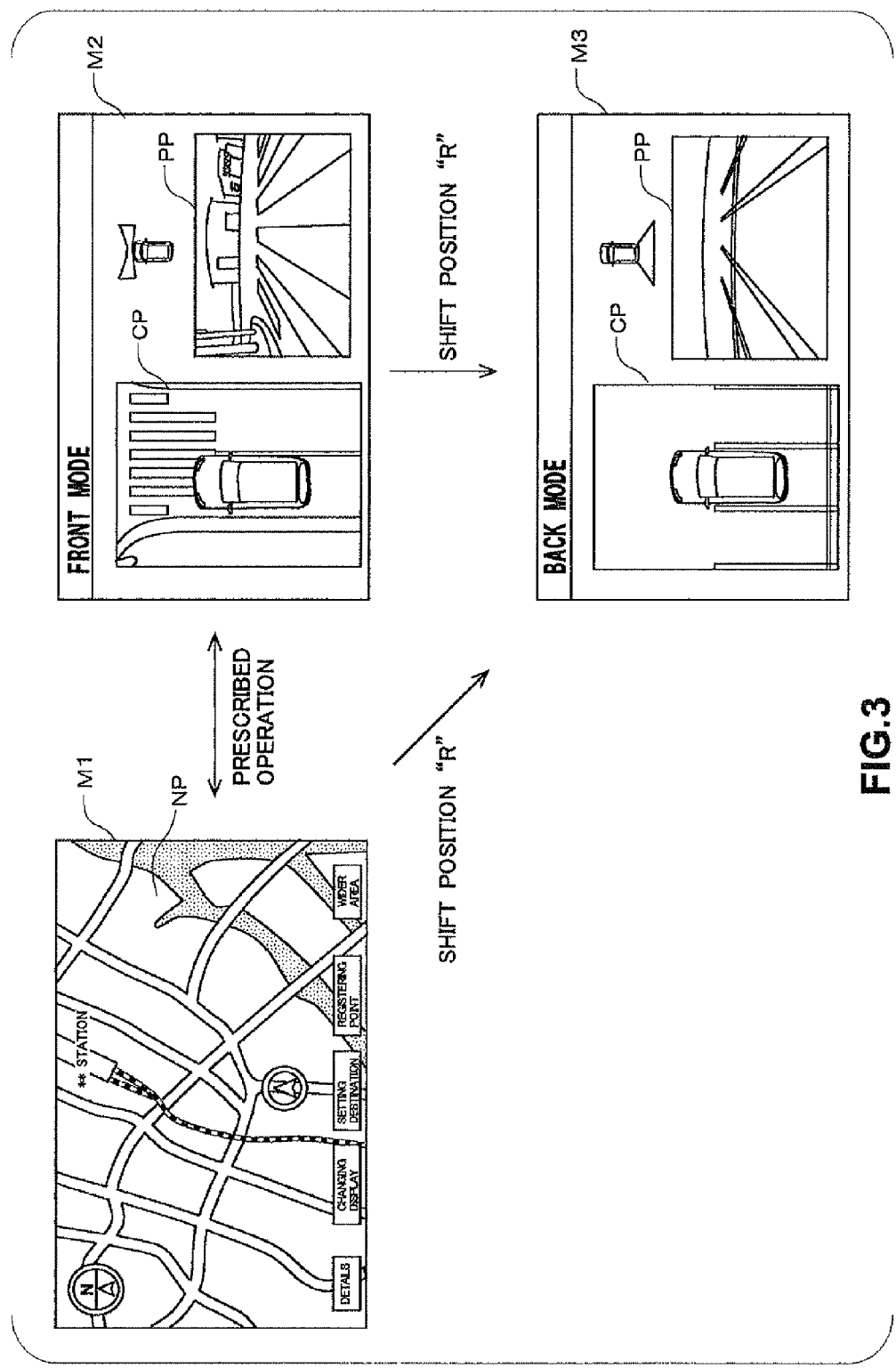
FIG. 3 is a figure showing operation mode transitions in the image display system.

Next, operation modes of the image display system 120 are described. FIG. 3 is a figure showing operation mode transitions in the image display system 120. The image display system 120 has three operation modes, a Navi mode M1, a front mode M2 and a back mode M3. Such operation modes are switched by the control of the controller 1 in accordance with, driver's operations or driving states of the vehicle 9.

The Navi mode M1 is an operation mode that displays a map image NP for navigation assistance mainly on the display 21, based on a function of the navigation apparatus 20. In the Navi mode M1, a variety of information based on a standalone function of the navigation apparatus 20 are displayed with no using of the functions of the image generation apparatus 100.

In contrast, the front mode M2 and the back mode M3 are operation modes that display a surrounding area of the vehicle 9 to a user using a shot image PP and a composite image CP in real time on the display 21, using the functions of the image generation apparatus 100.

The front mode M2 is an operation mode that displays mainly the images of forward and side area seen from the vehicle 9, which are required for driving forward. In an example, as shown in FIG. 3, the display 21 displays a composite image CP showing the vehicle 9 and the surrounding of the vehicle 9 being viewed from above the vehicle 9 as a virtual viewpoint (birds-eye view), and displays a shot image PP taken by the front camera 51 simultaneously. It is acceptable that the virtual viewpoint location of the composite image CP is moved in accordance with a user's operation to somewhere such as the backward from the vehicle 9, not only right-above the vehicle 9.

The back mode M3 is an operation mode that displays mainly the images of a rear area of the vehicle 9, which are required for moving backward. In an example, as shown in FIG. 3, the display 21 displays a composite image CP showing the vehicle 9 and the surrounding of the vehicle 9 being viewed from above the vehicle 9 as a virtual viewpoint (birds-eye view), and displays a shot image PP taken by the rear camera 52 simultaneously. It is acceptable that the virtual viewpoint location of the composite image CP is moved in accordance with a user's operation to somewhere such as the forward from the vehicle 9, not only right-above the vehicle 9.

A predetermined operation at the Navi mode M1 to the operation part 22 of the navigation apparatus 20 switches the screen to the front mode M2. A predetermined operation at the front mode M2 to the operation part 22 of the navigation apparatus 20 switches the screen to the Navi mode M1. It is acceptable that screen-switching between the Navi mode M1 and the front mode M2 is done in accordance with vehicle speed indicated by signals transmitted from the vehicle speed sensor 82.

When the shift position sensor 81 transmits a signal indicating a shift position of "R (Reverse)" at the Navi mode M1 or the front mode M2, the screen is switched to the back mode M3. That is, since the shift position of "R (Reverse)" indicates the state where the vehicle 9 moves backward, the screen is switched to the back mode M3 that displays mainly the rear area of the vehicle 9. When the shift position is changed from "R (Reverse)" to the others at the back mode M3, the operation mode is switched back to the operation mode that was displayed just before being switched to the back mode M3.

<1-3. Generation of Composite Image>

Figure 4:
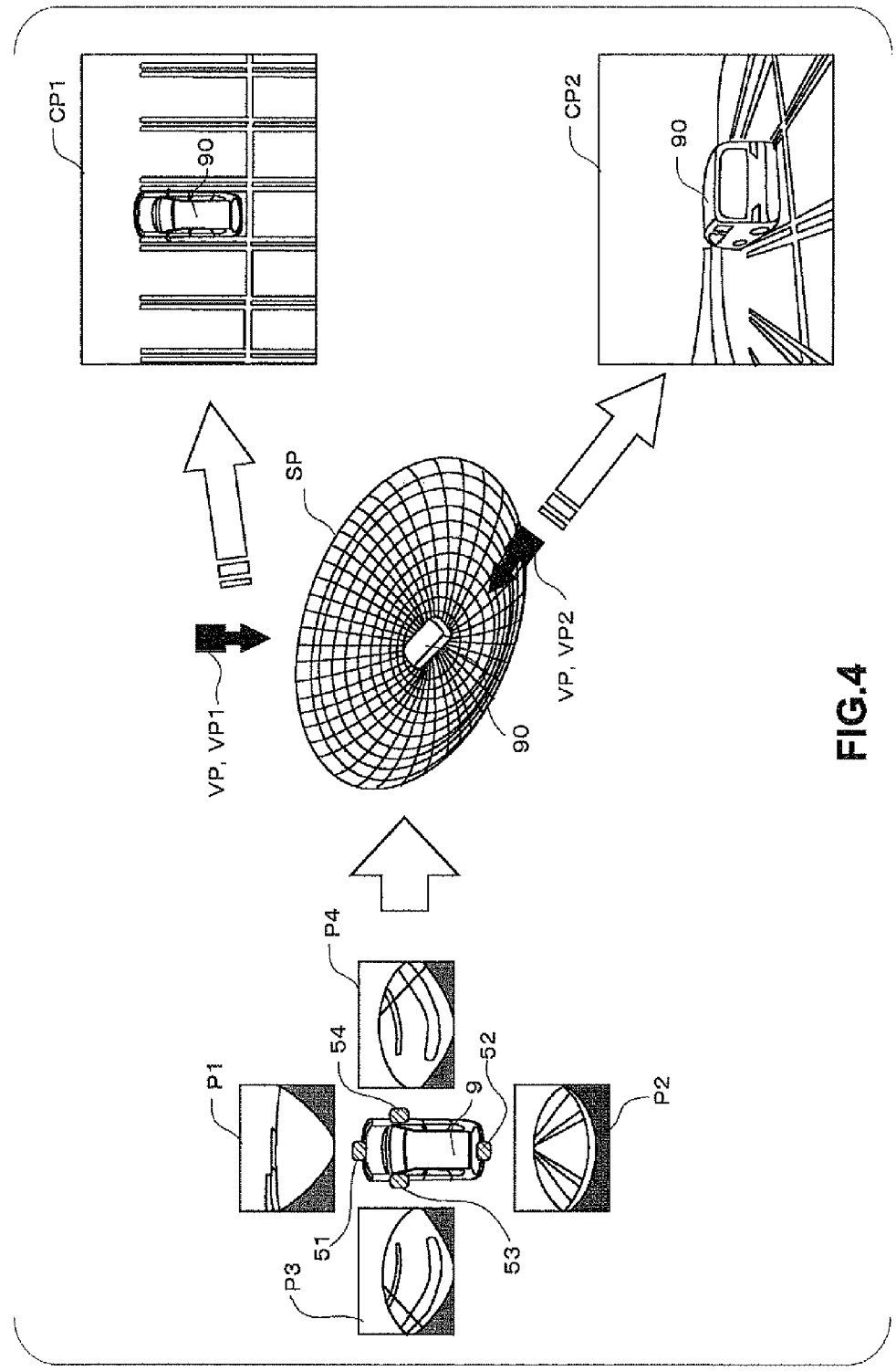
FIG. 4 is a figure describing a method for generating a composite image.

Here is a description about the method where the composite image generator 32 of the image generator 3 generates a composite image that shows a surrounding area of the vehicle 9 viewed from an arbitrary virtual viewpoint based on the plural shot images taken by the shooting part 5. When generating a composite image, the model data 4a stored in the nonvolatile memory 40 in advance is used. FIG. 4 is a figure describing a method for generating a composite image.

When the four on-vehicle cameras 51, 52, 53 and 54 of the shooting part 5 shoot at a time, the front camera 51 obtains a shot image P1 showing the front of the vehicle 9, the rear camera 52 obtains a shot image P2 showing the rear of the vehicle 9, the left-side camera 53 obtains a shot image P3 showing the left-side of the vehicle 9, and the right-side camera 54 obtains a shot image P4 showing the right-side of the vehicle 9. These four shot images P1, P2, P3 and P4 include information of all areas around the vehicle 9 at a time of shooting.

Each pixel of the four shot images P1, P2, P3 and P4 is projected on a curved surface SP of a virtual three-dimensional space. The curved surface SP is, for example, a substantially-hemispherical shape (bowl shape), and the vehicle 9 is to be located at its center (the bottom of the bowl). The correspondence relations between the location of each pixel of the shot images P1, P2, P3 and P4 and the location of each pixel of the curved surface SP are determined in advance. Thus, the value of each pixel of the curved surface SP is determined, based on the correspondence relation and the value of each pixel included in the shot images P1, P2, P3 and P4.

Besides, the correspondence relations between the location of each pixel of the shot images P1, P2, P3 and P4 and the location of each pixel of the curved surface SP are dependent on the locations (relative distances, ground heights, optic axis angles, etc.) of four on-vehicle cameras 51, 52, 53 and 54 of the vehicle 9. Thus, the table data indicating these correspondence relations are included in the model data 4a stored in the nonvolatile memory 40.

A vehicle image 90 which is a polygon model indicating three dimensional shape of the vehicle 9 is created in virtual, by using polygon data included in the model data 4a indicating a shape and a size of a vehicle. The vehicle image 90 that is created is located at the center of the substantially-hemispherical shape, which is prescribed as the location of the vehicle 9, on the curved surface SP in the three dimensional space.

Moreover, a virtual viewpoint VP is set up in the three dimensional space where the curved surface SP exists, by the image controller 11 of the controller 1. The virtual viewpoint VP is prescribed by a viewpoint location and by direction of a visual field, and is placed at the arbitrary viewpoint location and is headed to the arbitrary direction of a visual field, in the three-dimensional space corresponding to the surrounding area of the vehicle 9.

In accordance with the virtual viewpoint VP that is placed, the required area is clipped from the curved surface SP as an image. The predetermined relations between the virtual viewpoint VP and the required area on the curved surface SP are stored in the nonvolatile memory 40 in advance as table data. On the other hand, as for the vehicle image 90 created in a polygon model corresponding to the virtual viewpoint VP that is placed, the vehicle image 90 rendered in two dimensions is superposed on the clipped image. In this way, a composite image indicating the vehicle 9 and surrounding area of the vehicle 9 viewed from an arbitrary virtual viewpoint is generated.

For example, the composite image CP1 (birds-eye view) looking down at the vehicle 9 (the vehicle image 90, actually) and surrounding of the vehicle 9 from right above the vehicle 9 is generated, when the virtual viewpoint VP1 is placed on substantially-center and right-above the vehicle 9, and the direction of the visual field is heading to right-under. In another example, the composite image CP2 looking at the vehicle 9 (the vehicle image 90, actually) and surrounding of the vehicle 9 from the rear-left of the vehicle 9 is generated, when the virtual viewpoint VP2 is placed on substantially-rear-left of the vehicle 9, and the direction of the visual field is heading to substantially-front of the vehicle 9.

In the actual case of generating a composite image, there is no need to decide all of the pixel values of the curved surface SP. To improve the processing speed, only the pixel values of the area required for generating the composite image corresponding to the virtual viewpoint VP that is placed are needed to be decided, based on the shot images P1, P2, P3 and P4.

As mentioned above, the area LA1 and the area LA2 are the areas that two adjacent on-vehicle cameras shoot in overlap. (Refer to FIG. 2.) The curved surface SP includes the areas corresponding to the area LA1 and the area LA2 that are shot in overlap. Hereinafter, such each area corresponding to two shot images overlapped is referred to as "overlap area(s)." Since a composite image is generated using the clipped part of the curved surface SP, the overlap areas of the curved surface SP are the overlap areas of the composite image.

Figure 5:
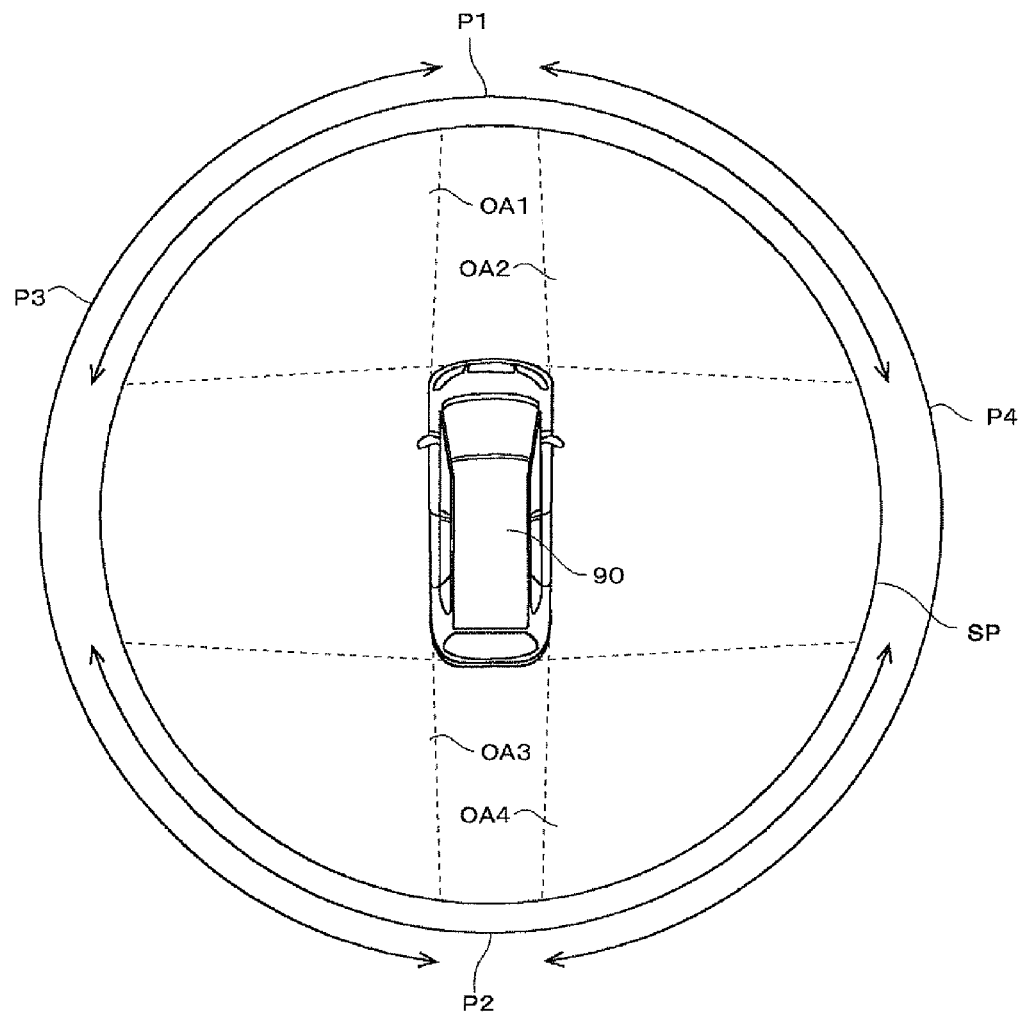
FIG. 5 is a figure showing areas corresponding to shot images on a curved surface.

FIG. 5 is a figure showing respective areas corresponding to the shot images P1, P2, P3 and P4. In FIG. 5, the respective areas corresponding to the shot images P1, P2, P3 and P4 are indicated by arrows with such respective shot image codes.

As, shown in FIG. 5, the curved surface SP includes four overlap areas OA1, OA2, OA3 and OA4. Concretely, the overlap area OA1 in the front-left area of the vehicle image 90 corresponds to the area LA1 in the front-left area of the vehicle 9, being included into the both areas of the shot image P1 of the front image and the shot image P3 of the left-side image. The overlap area OA2 in the front-right area of the vehicle image 90 corresponds to the area LA2 in the front-right area of the vehicle 9, being included into the both areas of the shot image P1 of the forward image and the shot image P4 of the right-side image. The overlap area OA3 in the rear-left area of the vehicle image 90 corresponds to the area LA3 in the rear-left area of the vehicle 9, being included into the both areas of the shot image P2 of the rear image and the shot image P3 of the left-side image. The overlap area OA4 in the rear-right area of the vehicle image 90 corresponds to the area LA4 in the rear-right of the vehicle 9, being included into the both areas of the shot image P2 of the rear image and the shot image P4 of the right-side image.

These pixel values of the overlap areas OA1, OA2, OA3 and OA4 on the curved surface SP are derived by combining the pixel values of the two corresponding shot images. The overlap areas OA1 and OA2 have symmetrical relationship, and the overlap areas OA3 and OA4 have symmetrical relationship. Here are concrete descriptions of image processing only regarding the overlap area OA1 and the overlap area OA3. The image processing to the overlap areas OA2 and OA4 are implemented in a similar but left/right inverted way.

Figure 6:
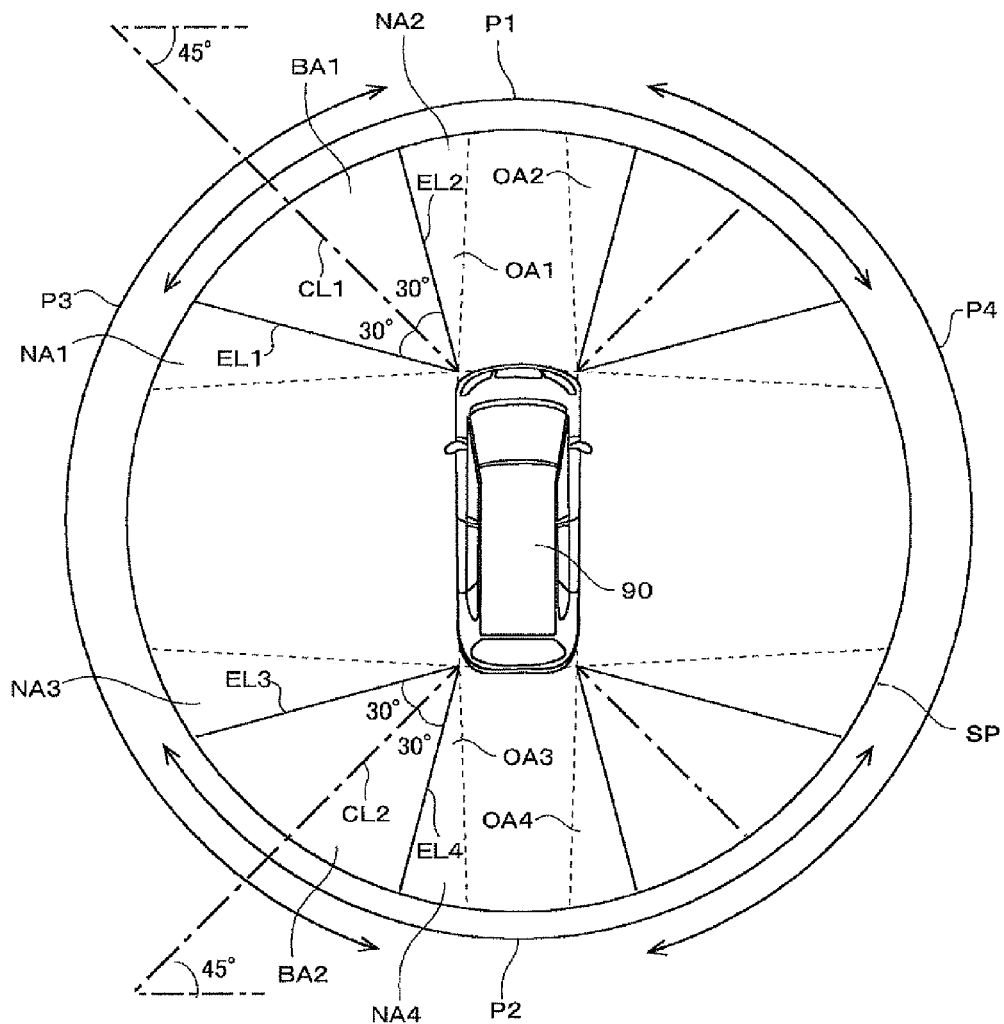
FIG. 6 is a figure describing a method for deriving pixel values in overlap areas in a normal case.

FIG. 6 is a figure describing a method for deriving the pixel values in the overlap areas OA1, OA2, OA3 and OA4 on the curved surface SP. In FIG. 6, the respective areas corresponding to the shot images P1, P2, P3 and P4 are indicated by arrows with such respective shot image codes.

In the overlap area OA1, a line segment that starts from the front-left corner of the vehicle image 90 and that extends in 45° angles against the left-right line of the vehicle image 90 is deemed as a standard line CL1. The shot image P1 of a front image is used in a range up to a line segment EL1 that starts from an origin point of the front-left corner and rotates in 30° angles counterclockwise from the standard line CL1. The shot image P3 of a left-side image is used in a range up to a line segment EL2 that rotates in 30° angles clockwise from the standard line CL1.

Thus, only the pixel values of the shot image P3 of a left-side image are used for an area NA1 that is in the counterclockwise side from the line segment EL1, within the overlap area OA1. Similarly, only the pixel values of the shot image P1 of a front image are used for an area NA2 that is in the clockwise side from the line segment EL2, within the overlap area OA1. The pixel values of an area BA1 that is located between the line segment EL1 and the line segment EL2 are derived by an alpha blending method using the two pixel values of the shot image P1 of the front image and the shot image P3 of the left-side image in the same proportions (0.5:0.5).

Further, in the overlap area OA3, a line segment that starts from the rear-left corner of the vehicle image 90 and that is extended in 45° angles against the left-right line of the vehicle image 90 is deemed as a standard line CL2. The shot image P2 of a rear image is used in a range up to a line segment EL3 that starts from an origin point of the rear-left corner and rotates in 30° angles clockwise from the standard line CL2. The shot image P3 of a left-side image is used in a range up to a line segment EL4 that rotates in 30° angles counterclockwise from the standard line CL2.

Thus, only the pixel values of the shot image P3 of the left-side image are used for an area NA3 that is in the clockwise side from the line segment EL3, within the overlap area OA3. Similarly, only the pixel values of the shot image P2 of a rear image are used for an area NA4 that is in the counterclockwise side from the line segment EL4, within the overlap area OA3. The pixel values of an area BA2 that is located between the line segment EL3 and the line segment EL4 are derived by the alpha blending method using the two pixel values of the shot image P2 of the rear image and the shot image P3 of the left-side image, using the same proportions (0.5:0.5).

<1-4. Problem Caused by Lighting of Lighting Apparatus>

Lighting of a lighting apparatus changes the brightness of the shot images P1, P2, P3 and P4. The change influences a composite image because it is generated using the shot images P1, P2, P3 and P4. Hereafter, the influence on the composite image caused by lighting of a lighting apparatus is described.

Figure 7:
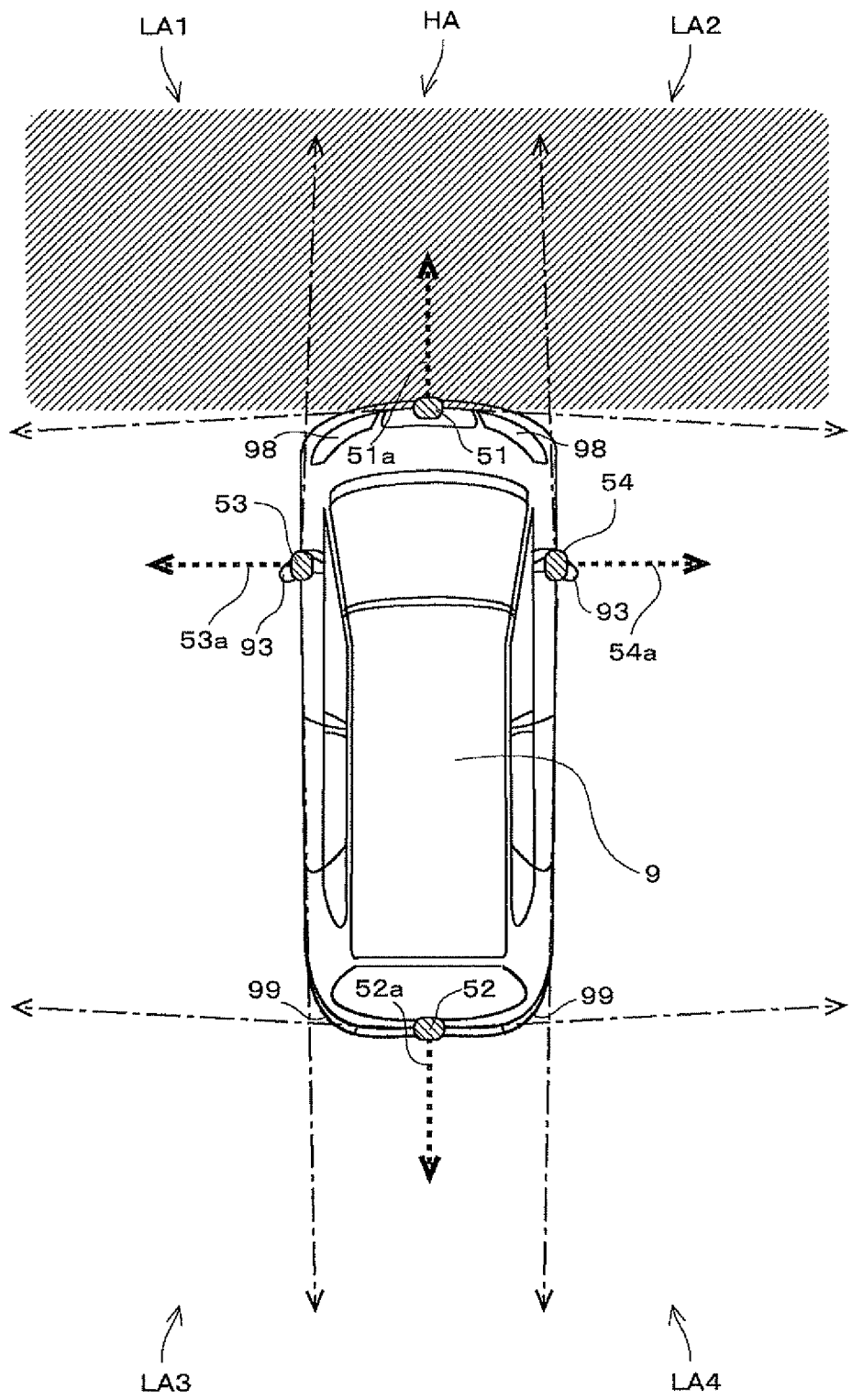

FIG. 7 is a figure showing a lighting mode in which headlights 98 of the vehicle 9 are on. An area HA indicated by hatched lines in FIG. 7 shows an area that is lighted by the headlights 98. As in FIG. 7, the headlights 98 light two front areas of the area LA1 and the area LA2 that two on-vehicle cameras can shoot in overlap.

Here is a case of generating a composite image when the headlights 98 are on because it is dark around the vehicle 9 such as at nighttime.

The optical axis 51a of the front camera 51 heads toward the area lighted by the headlights 98. The front camera 51 implements exposure control, so that the image brightness of a target in the area lighted by the headlights 98 becomes proper. Since the headlights 98 light the area LA, the image of a target in the area LA1 included in the shot image P1 shot by the front camera 51 is shown in proper brightness.

On the other hand, the optical axis 53a of the left-side camera 53 heads toward the left side area of the vehicle 9, which is not lighted by the headlights 98. Thus, the left-side camera 53 implements exposure control, so that the image of a target in the very dark area with no light becomes brighter. Since the headlights 98 light the area LA1, the image of a target in the area LA1 included in the shot image P3 shot by the left-side camera 53 becomes too bright and whiteout occurs.

Here is an assumption; the pixel values of the overlap area OA1 on the curved surface SP are to be derived by the method indicated in FIG. 6, using the shot images P1 and P3 taken by the manners mentioned above, with the shot images P2 and P4. In the area NA2 that is located on the clockwise side from the line segment EL2 within the overlap area OA1, the image brightness becomes proper because only the shot image P1 of a front image is used. However, in the area NA1 that is located on the counterclockwise side from the line segment EL1, whiteout occurs because only the shot image P3 of the left side image is used. In the area BA1 that is located between the line segment EL1 and the line segment EL2, color migration occurs because an image is generated by the alpha blending method using the two pixel values having extremely different brightness of the shot image P1 and the shot image P3. The image of a target in the overlap area OA1 on the composite image including the overlap area OA1 is extremely deteriorated in visibility. This phenomenon also occurs in the overlap area OA2.

Figure 8:
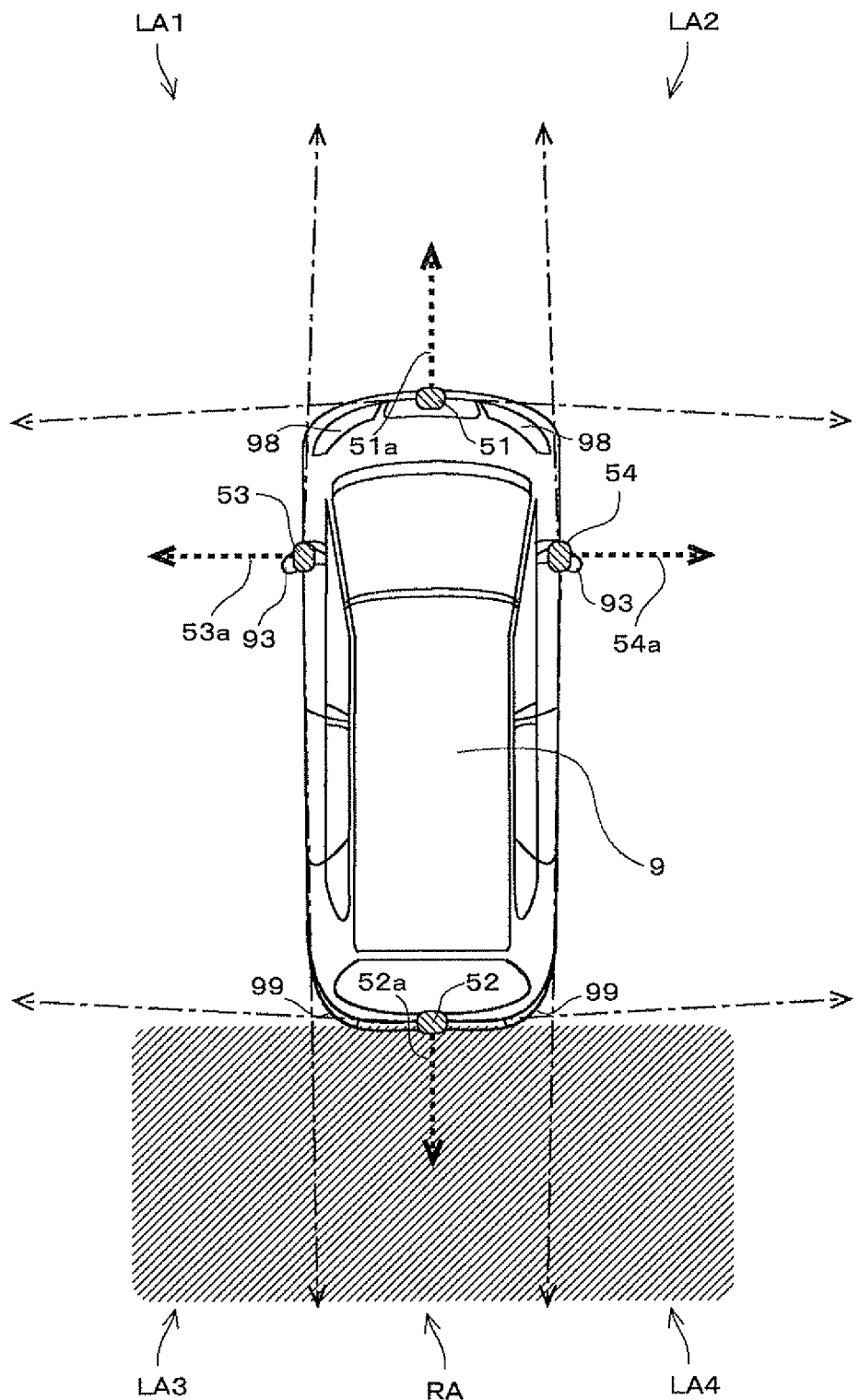

FIG. 8 is a figure showing a lighting mode in which brake lights 99 of the vehicle 9 are on. An area RA indicated by hatched lines in FIG. 8 shows an area that is lighted by the brake lights 99. As in FIG. 8, the brake lights 99 light two rear areas of an area LA3 and an area LA4 that two on-vehicle cameras can shoot in overlap.

Here is a case of generating a composite image when the brake lights 99 are on due to the darkness around the vehicle 9 such as at nighttime.

The optical axis 52a of the rear camera 52 heads toward the area lighted by the brake lights 99. The rear camera 52 implements exposure control, so that the image brightness of a target in the area lighted by the brake lights 99 becomes proper. Since the brake lights 99 light the area LA3, the image of a target in the area LA3 included in the shot image P2 shot by the rear camera 52 is shown in proper brightness.

On the other hand, the optical axis 53a of the left-side camera 53 heads toward the left side area of the vehicle 9, which is not lighted by the brake lights 99. Thus, the left-side camera 53 implements exposure control, so that the image of a target in the very dark area with no light becomes brighter. Since the brake lights 99 light the area LA3, the image of a target in the area LA3 included in the shot image P3 shot by the left-side camera 53 becomes too bright and whiteout occurs.

Here is an assumption; the pixel values of the overlap area OA3 on the curved surface SP are to be derived by the method indicated in FIG. 6, using the shot images P2 and P3 taken by the manners mentioned above, with the shot images P1 and P4. In the area NA4 that is located on the counterclockwise side from the line segment EL4 within the overlap area OA3, the image brightness becomes proper because only the shot image P2 of a rear image is used. However, in the area NA3 that is located on the clockwise side from the line segment EL3, whiteout occurs because only the shot image P3 of the left side image is used. In the area BA2 that is located between the line segment EL3 and the line segment EL4, color migration occurs because an image is generated by the alpha blending method using the two pixel values having extremely different brightness of the shot image P2 and the shot image P3. The image of a target in the overlap area OA3 on the composite image including the overlap area OA3 is extremely deteriorated in visibility. This phenomenon also occurs in the overlap area OA4.

<1-5. Reduction of Problem>

The image display system 120 of the embodiment, in the case where lighting apparatuses are off, derives the pixel values of the overlap areas OA1, OA2, OA3 and OA4 on the curved surface SP by the method in FIG. 6. However, in the case where lighting apparatuses are on, the image display system 120 of the embodiment derives the pixel values of the overlap areas OA1, OA2, OA3 and OA4 by the method partially different from the one in FIG. 6 in order to reduce problems of a composite image caused by lighting as described above.

Figure 9:
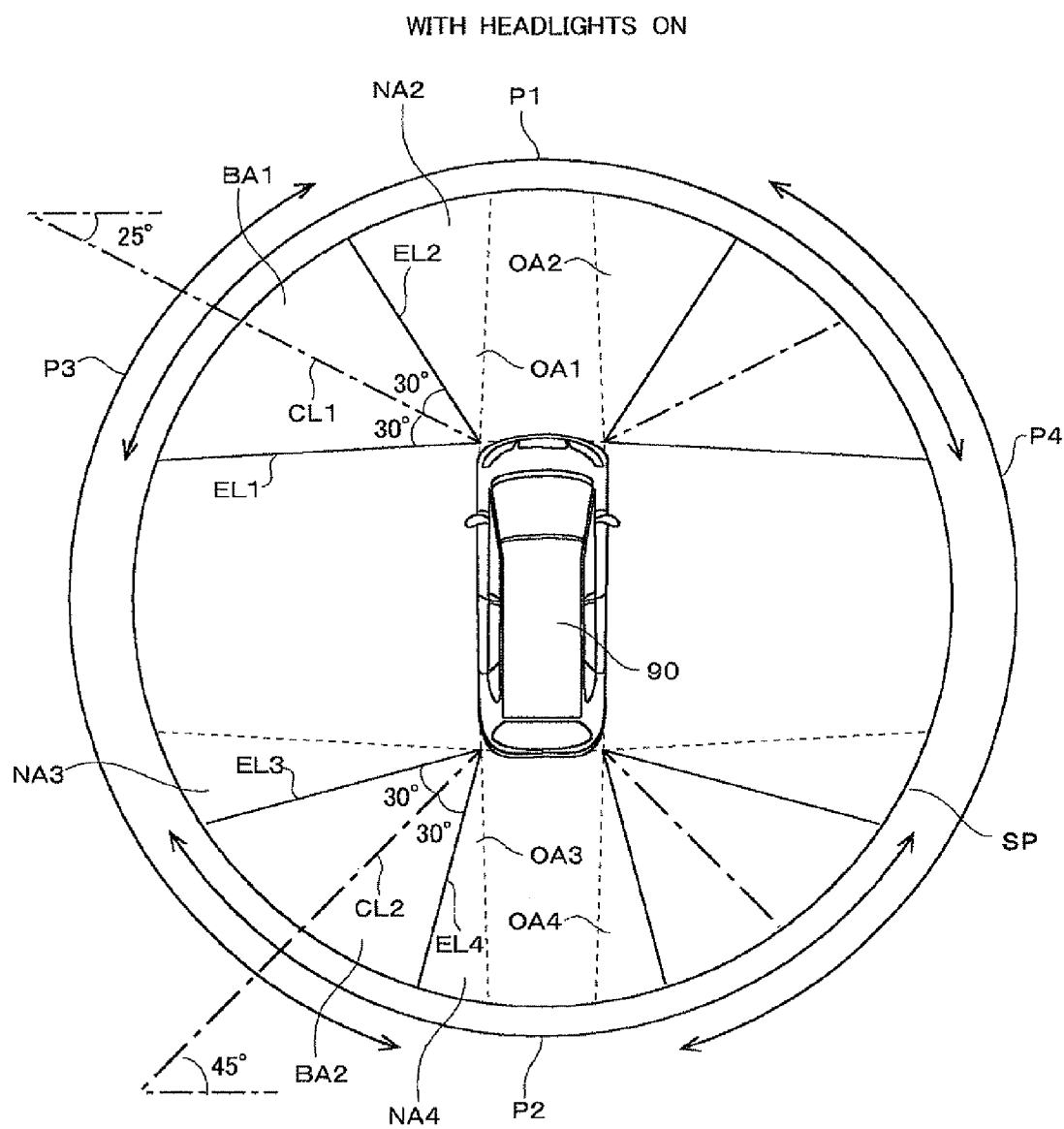

FIG. 9 is a figure describing a method for deriving the pixel values in the overlap areas OA1, OA2, OA3 and OA4 on the curved surface SP in the case where the headlights 98 are on. In FIG. 9, the respective areas corresponding to the four shot images P1, P2, P3 and P4 are indicated by arrows with such respective shot image codes.

In the method in FIG. 9 as compared to the one in FIG. 6, while the area where the shot image P1 in proper brightness is used is expanded at a maximum, the area where the shot image P3 with whiteout occurred is used is narrowed. In other words, this method increases data volume of the shot image P1 taken by the front camera 51 whose optical axis heads toward the area lighted by the headlights 98, and decreases data volume of the shot image P3 taken by the left-side camera 53 whose optical axis heads toward the area not lighted by the headlights 98.

Concretely, in the overlap area OA1, a line segment that starts from the front-left corner of the vehicle image 90 and that extends in 25° angles against the left-right line of the vehicle image 90 is deemed as a standard line CL1. The shot image P1 of a front image is used in a range up to a line segment EL1 that starts from an origin point of the front-left corner and rotates in 30° angles counterclockwise from the standard line CL1. The shot image P3 of a left-side image is used in a range up to a line segment EL2 that rotates in 30° angles clockwise from the standard line CL1.

Thus, compared to the method in FIG. 6, the area BA1 located between the line segment EL1 and the line segment EL2 is moved counterclockwise. This method makes the area NA2 wider where only the shot image P1 of a front image is used, and omits the area NA1 where only the shot image P3 of a left side image is used. In other words, in the overlap area OA1, the area in proper brightness is expanded, and the area with whiteout occurred is omitted. As a result, visibility for the image of a target in the overlap area OA1 is improved on a composite image including the overlap area OA1. On the method in FIG. 9, the same as the method in FIG. 6 is used for the overlap areas OA3 and OA4 located in the backward area of the vehicle image 90.

Figure 10:
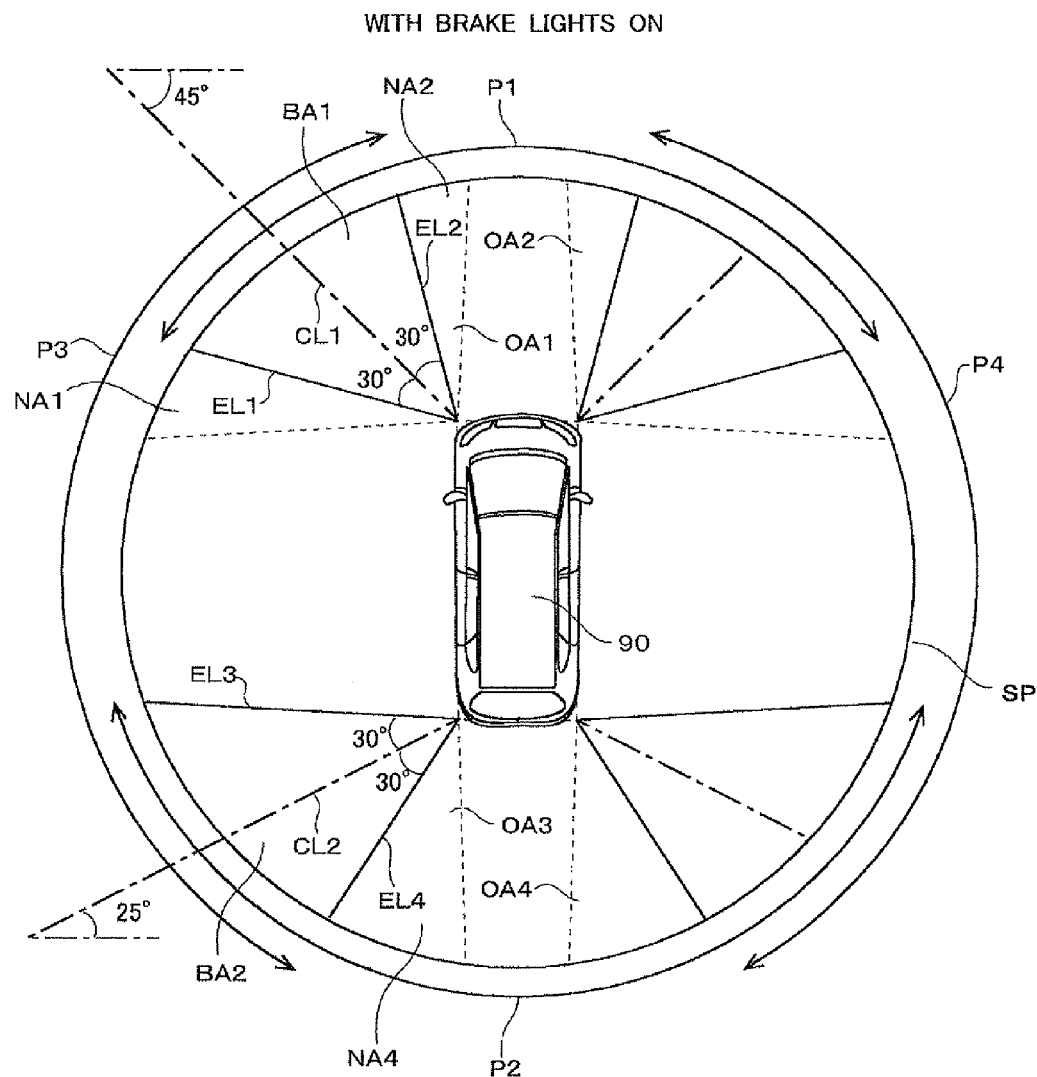

FIG. 10 is a figure describing a method for deriving the pixel values in the overlap areas OA1, OA2, OA3 and OA4 on the curved surface SP in the case where the brake lights 99 are on. In FIG. 10, the respective areas corresponding to the shot images P1, P2, P3 and P4 are indicated by arrows with such respective shot image codes.

In the method in FIG. 10 as compared to the one in FIG. 6, while the area where the shot image P2 in proper brightness is used is expanded at a maximum, the area where the shot image P3 with whiteout occurred is used is narrowed. In other words, this method increases data volume of the shot image P2 taken by the rear camera 52 whose optical axis heads toward the area lighted by the brake lights 99, and decreases data volume of the shot image P3 taken by the left-side camera 53 whose optical axis heads toward the area not lighted by the brake lights 99.

Concretely, in the overlap area OA3, a line segment that starts from the rear-left corner of the vehicle image 90 and that extends in 25° angles against the left-right line of the vehicle image 90 is deemed as a standard line CL2. The shot image P2 of a rear image is used in a range up to a line segment EL3 that starts from an origin point of the rear-left corner and rotates in 30° angles clockwise from the standard line CL2. The shot image P3 of a left-side image is used in a range up to a line segment EL4 that rotates in 30° angles counterclockwise from the standard line CL2.

Thus, compared to the method in FIG. 6, the area BA2 located between the line segment EL3 and the line segment EL4 is moved clockwise. This method makes the area NA4 wider where only the shot image P2 of a rear image is used, and omits the area NA3 where only the shot image P3 of a left side image is used. In other words, in the overlap area OA3, the area in proper brightness is expanded, and the area with whiteout occurred is omitted. As a result, visibility for the image of a target in the overlap area OA3 is improved on a composite image including the overlap area OA3. On the method in FIG. 10, the same as the method in FIG. 6 is used for the overlap areas OA1 and OA2 located in the forward area of the vehicle image 90.

Figure 11:
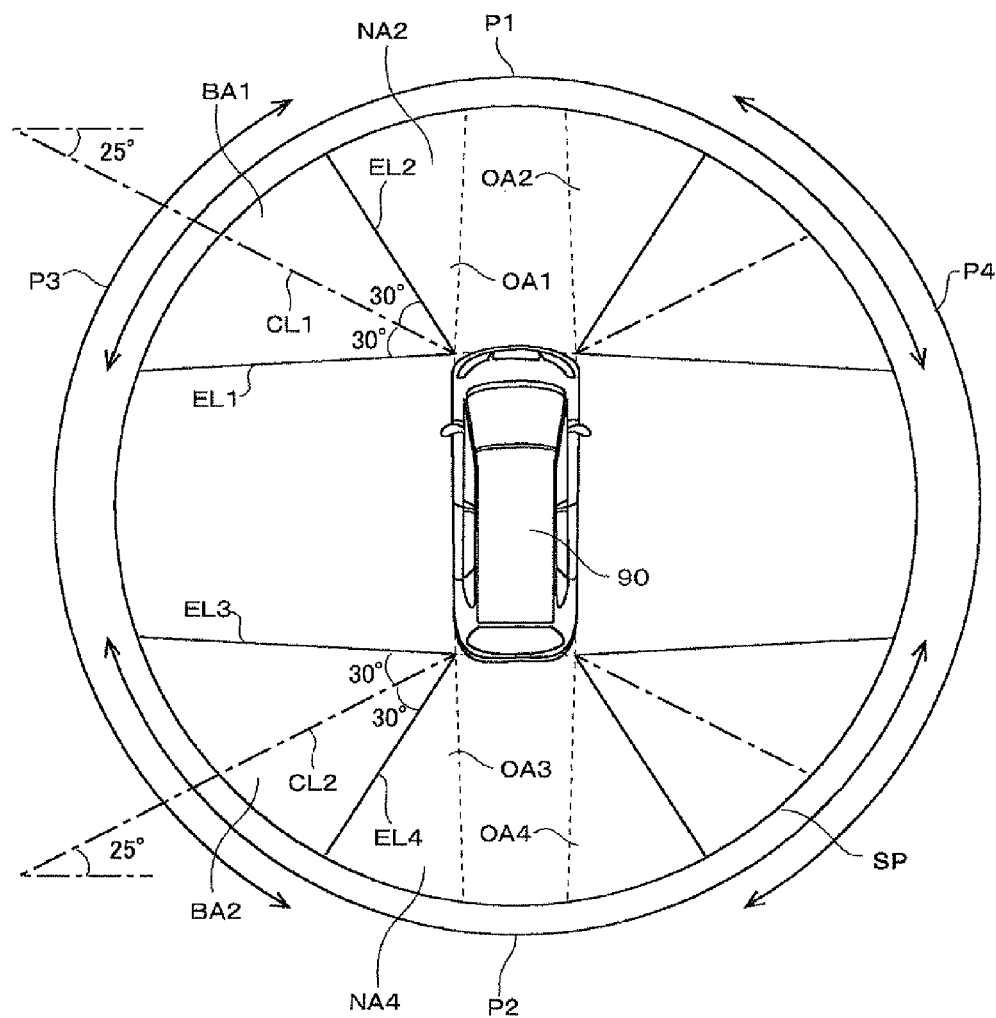

In the case where both of the headlights 98 and the brake lights 99 are on, the method in FIG. 9 is adopted for the overlap areas OA1 and OA2 existing in a front area of the vehicle image 90, and the method in FIG. 10 is adopted for the overlap areas OA3 and OA4 existing in a rear area of the vehicle image 90, as shown in FIG. 11.

<1-6. Processing Flow>

Figure 12:
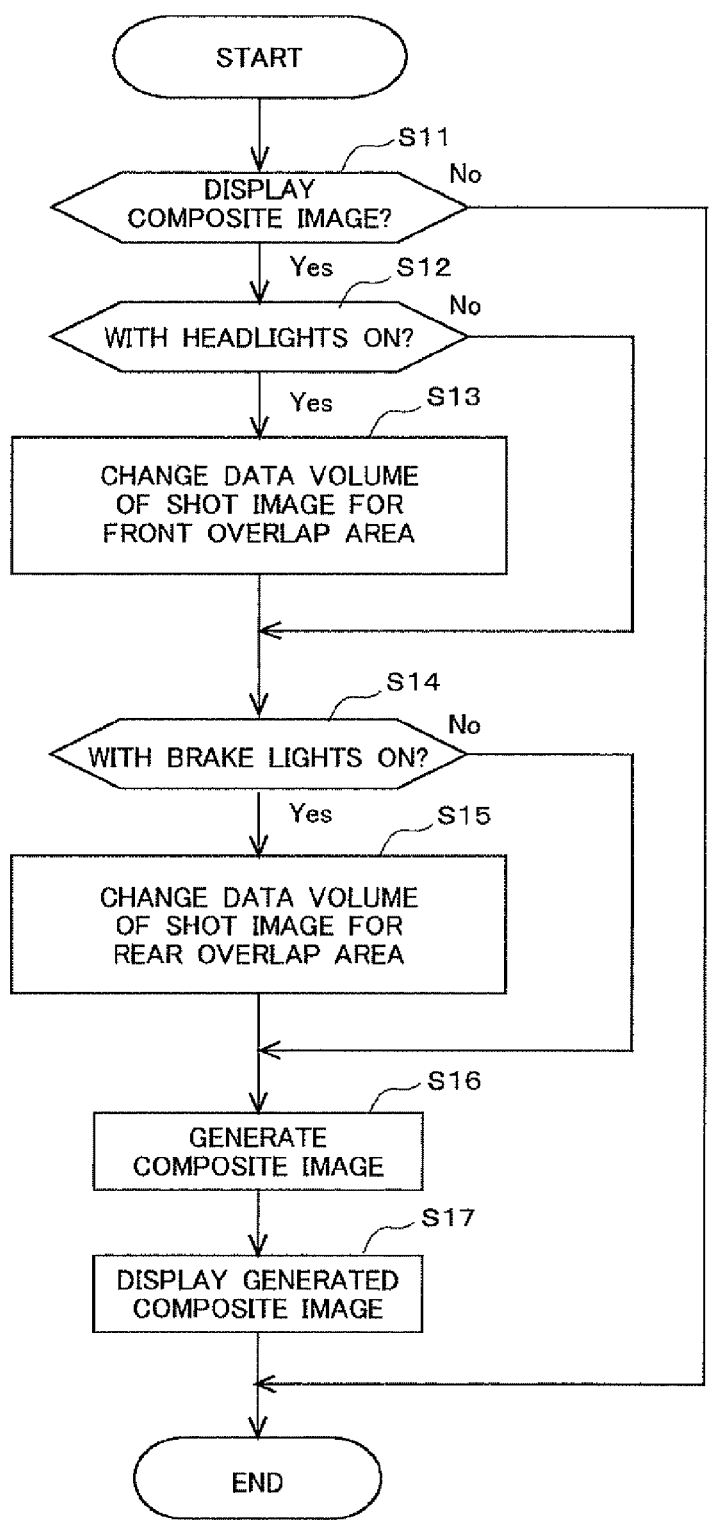
FIG. 12 is a figure showing processing flow when the image display system displays a composite image.

This section describes processing flow in which the image display system 120 derives pixel values of the overlap areas OA1, OA2, OA3 and OA4 in accordance with the lighting statuses of the lighting apparatuses. FIG. 12 is a flow chart showing the processing in which the image display system 120 displays a composite image. This processing is repeated in accordance with the control by the controller 1.

Firstly, it is judged whether the operation mode is for displaying a composite image of the surrounding area of the vehicle 9 on the display 21 (step S11). Concretely, it is judged whether the operation mode is one of the front mode M2 and the back mode M3. In the case where the operation mode is the Navi mode M1 (No at the step S11), the processing ends with no composite image displayed.

In the case where the operation mode is one of the front mode M2 and the back mode M3 (Yes at the step S11), next, it is judged whether the headlights 98 are on (step S12). The lighting mode of the headlights 98 is judged based on a signal transmitted from the lighting control apparatus 84. In the case where the headlights 98 are not on (No at the step S12), the processing moves to a step S14.

In the case where the headlights 98 are on, the image controller 11 changes the method for deriving pixel values relating to the overlap areas OA1 and OA2 of a front image of the vehicle image 90 on the curved surface SP from the method in FIG. 6 to the method in FIG. 9. In other word's, compared to the case where the headlights 98 are not on, this method increases data volume of the shot image P1 taken by the front camera 51 for the overlap areas OA1 and OA2, and decreases data volume of the shot image P3 taken by the left-side camera 53 (step S13).

Next, it is judged whether the brake lights 99 are on or not (step S14). The lighting mode of the brake lights 99 is judged based on a signal transmitted from the lighting control apparatus 84. In the case where the brake lights 99 are not on (No at the step S14), the processing moves to a step S16.

In the case where the brake lights 99 are on, the image controller 11 changes the method for deriving pixel values relating to the overlap areas OA3 and OA4 of a rear image of the vehicle image 90 on the curved surface SP from the method in FIG. 6 to the method in FIG. 10. In other words, compared to the case where the brake lights 99 are not on, this method increases data volume of the shot image P2 taken by the rear camera 52 for the overlap areas OA3 and OA4, and decreases data volume of the shot image P3 taken by the left-side camera 53 (step S15).

Next, pixel values on the curved surface SP are derived respectively and a composite image is generated, by the method changed corresponding to the lighting modes of lighting apparatuses (step S16). Then, the composite image that is generated is displayed on the display 21 (step S17).

As described above, the image display system 120 of the embodiment changes the data volume in the overlap areas of a composite image corresponding to the surrounding area of the vehicle 9 that two on-vehicle cameras out of plural on-vehicle cameras shoot in overlap, in accordance with the lighting modes of the headlights 98 and the brake lights 99. This reduces the problems caused by lighting of the headlights 98 and the brake lights 99 in the overlap areas of a composite image.

In addition, since the method increases data volume of a shot image in proper brightness taken by an on-vehicle camera whose optical axis heads toward the area lighted by lighting apparatuses, and decreases data volume of a shot image taken by an on-vehicle camera whose optical axis does not head toward the area lighted by lighting apparatuses, the method reduces the problems caused in the overlap areas of a composite image effectively.

In addition, since the method increases the areas of the shot image in proper brightness taken by an on-vehicle camera whose optical axis heads toward the area lighted by lighting apparatuses, and decreases the areas of the shot image taken by an on-vehicle camera whose optical axis does not head toward the area lighted by lighting apparatuses, the method reduces the problems caused in the overlap areas of a composite image effectively.

2. Second Embodiment

This section describes the second embodiment. The second embodiment is almost the same as the first embodiment in its configuration and processing, but differs in some parts. Hereafter, the differences from the first embodiment are mainly described. In the case where lighting apparatuses are on, the second embodiment narrows the areas of the shot images where the alpha blending method is adopted as compared to the case where lighting apparatuses are not on.

Figure 13:
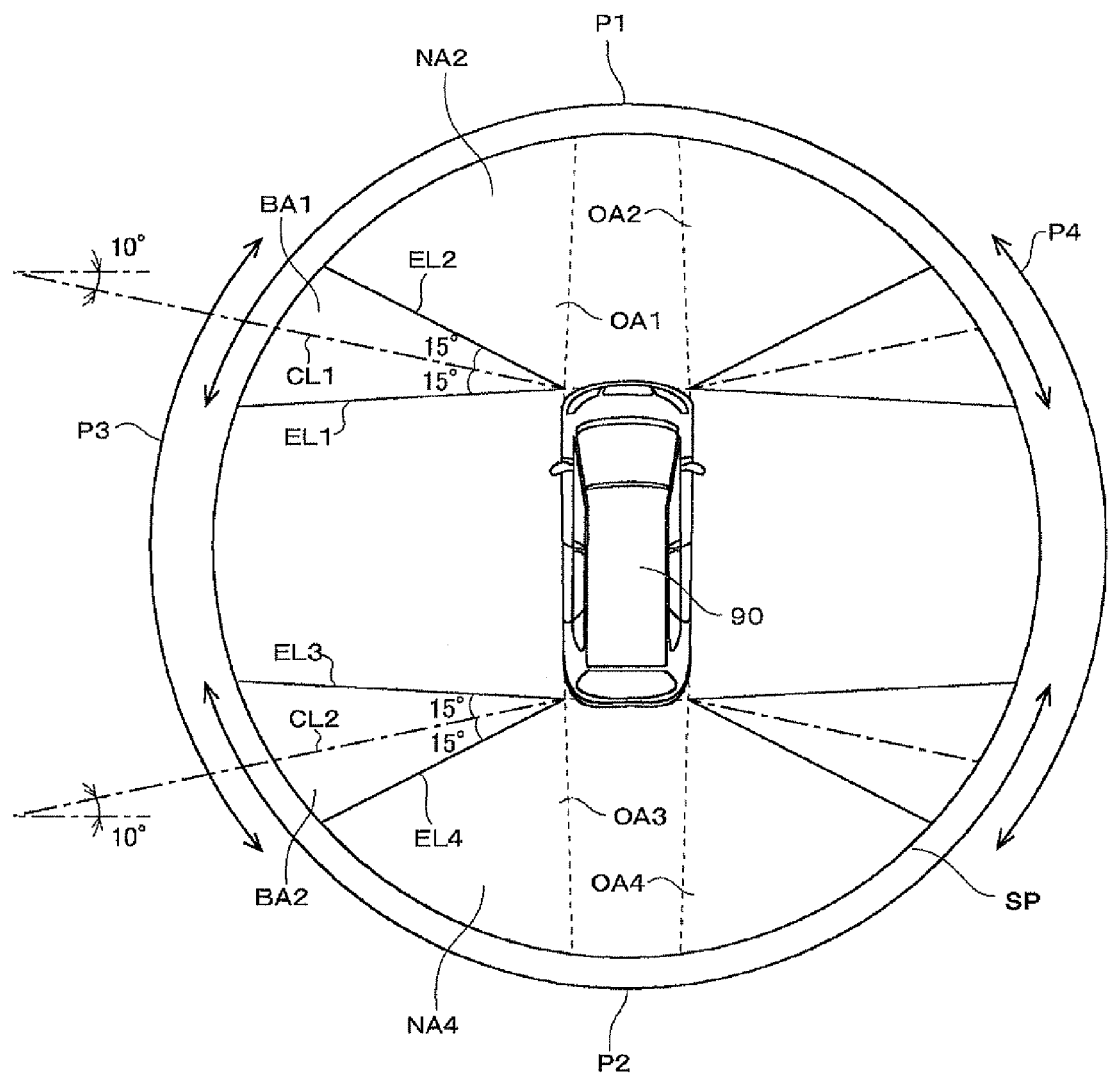
FIG. 13 is a figure of the second embodiment, describing a method for deriving pixel values in overlap areas.

FIG. 13 is a figure of the second embodiment, describing a method for deriving pixel values of the overlap areas OA1, OA2, OA3 and OA4 on the curved surface SP in the case where lighting apparatuses are on. In FIG. 13, the respective areas corresponding to the four shot images P1, P2, P3 and P4 are indicated by arrows with such respective shot image codes. FIG. 13 shows an example of the case that both of the headlights 98 and the brake lights 99 are on. However, in the case where only the headlights 98 are on, such method is adopted only for the overlap areas OA1 and OA2 existing in a front area of the vehicle image 90, and in the case where only the brake lights 99 are on, such method is adopted only for the overlap areas OA3 and OA4 existing in a rear area of the vehicle image 90.

In the overlap area OA1, a line segment that starts from the front-left corner of the vehicle image 90 and that extends in 10° angles against the left-right line of the vehicle image 90 is deemed as a standard line CL1. The shot image P1 of a front image is used in a range up to a line segment EL1 that starts from an origin point of the front-left corner and rotates in 15° angles counterclockwise from the standard line CL1. The shot image P3 of a left-side image is used in a range up to a line segment EL2 that rotates in 15° angles clockwise from the standard line CL1.

Thus, compared to the method in FIG. 9, the area BA1 between the line segment EL1 and the line segment EL2 where the alpha blending method is adopted on the shot image P1 and the shot image P3 is narrowed, and the area NA2 where only the shot image P1 of a forward image is used is furthermore expanded. In other words, in the overlap area OA1, the area having a proper brightness is expanded, and the area with color migration occurred is narrowed.

In the overlap area OA3, the line segment that starts from the rear-left corner of the vehicle image 90 and extends in 10° angles against the left-right line of the vehicle image 90 is deemed as a standard line CL2. The shot image P2 of a backward image is used in a range up to a line segment EL3 that starts from an origin point of the rear-left corner and that rotates in 15° angles clockwise from the standard line CL2. The shot image P3 of a left-side image is used in a range up to a line segment EL4 that rotates in 15° angles counterclockwise from the standard line CL2.

Thus, compared to the method in FIG. 10, the area 13A2 between the line segment EL3 and the ling segment EL4 where the alpha blending method is adopted on the shot image P2 and the shot image P3, is narrowed, and the area NA4 where only the shot image P2 of a backward image is used is furthermore expanded. In other words, in the overlap area OA3, the area in proper brightness is expanded, and the area with color migration occurred is narrowed.

3. Third Embodiment

Next, this section describes the third embodiment. The third embodiment is almost the same as the first embodiment in its configuration and processing, but differs in some parts. Hereafter, the differences from the first embodiment are mainly described. In the case where lighting apparatuses are on, the third embodiment uses, in the overlap areas, only the shot images which are taken by an on-vehicle camera whose optical axis heads toward the area lighted by lighting apparatuses. (i.e. shot images in which object images are displayed in proper brightness.)

Figure 14:
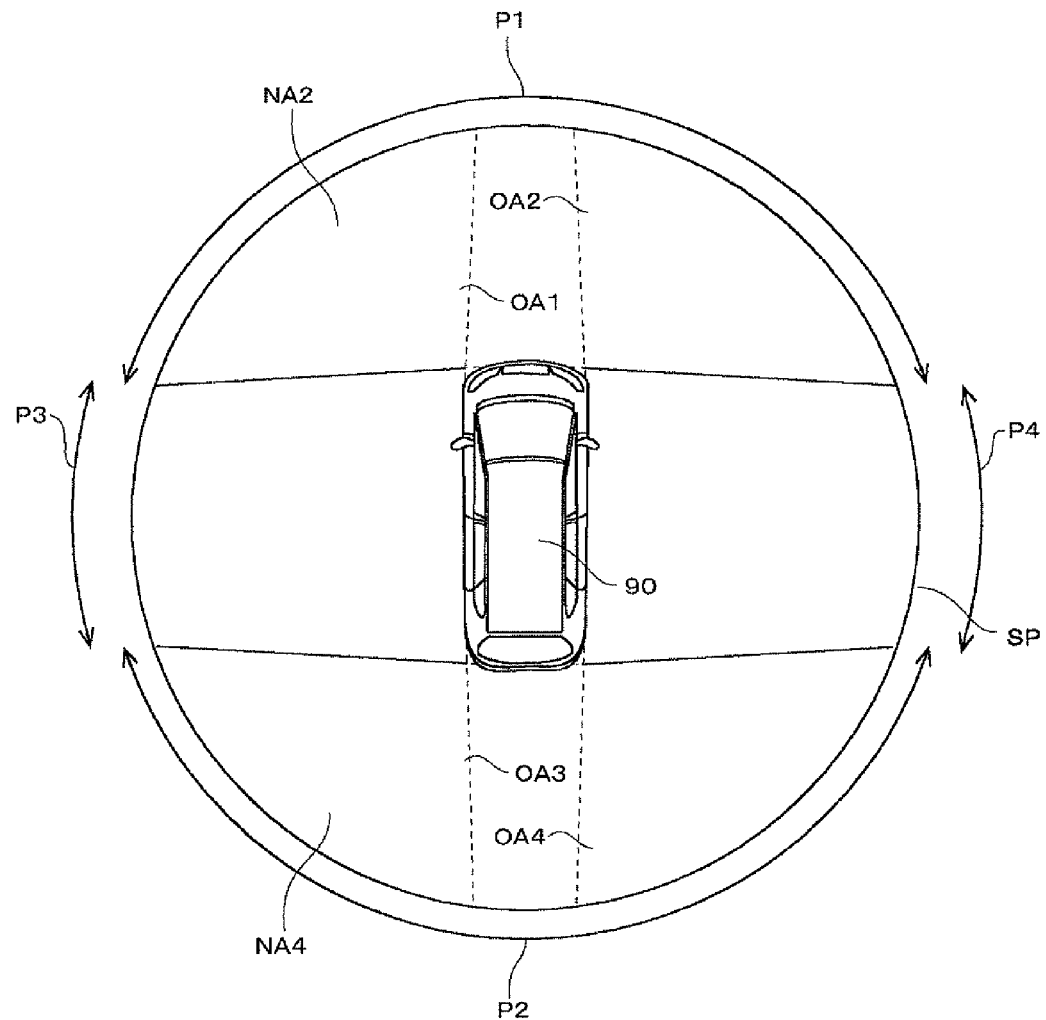
FIG. 14 is a figure of the third embodiment, describing a method for deriving pixel values in overlap areas.

FIG. 14 is a figure of the third embodiment, describing a method for deriving pixel values of the overlap areas OA1, OA2, OA3 and OA4 on the curved surface SP in the case where lighting apparatuses are on. In FIG. 14, the respective areas corresponding to the shot images P1, P2, P3 and P4 are indicated by arrows with such respective shot image codes. FIG. 14 shows an example of the case that both of the headlights 98 and the brake lights 99 are on. However, in the case where only the headlights 98 are on, such method is adopted only for the overlap areas OA1 and OA2 existing in a front area of the vehicle image 90, and in the case where only the brake lights 99 are on, such method is adopted only for the overlap areas OA3 and OA4 existing in a rear area of the vehicle image 90.

The area OA1 is occupied only by the NA2 where the shot image P1 of a forward image is only used, with no area of the area BA1 where the alpha blending method is adopted on the shot image P1 and the shot image P3. Thus, the shot image P3 of a left side image is not used at all in the overlap area OA1. In the overlap area OA1, this method uses only the area having proper brightness, and is free from the problems such as whiteout and color migration.

The area OA3 is also occupied only by the NA4 where the shot image P2 of a backward image is only used, with no area of the area BA2 where the alpha blending method is adopted on the shot image P2 and the shot image P3. Thus, the shot image P3 of a left side image is not used at all in the area OA3. In the overlap area OA3, this method uses only the area in proper brightness, and is free from the problems such as whiteout and color migration.

4. Modification

So far, some embodiments of the invention were described. The invention is not to be considered limited to the described embodiments above, but includes various modifications. This section describes these modifications. Every embodiment described above and below can be arbitrarily combined with others.

In the above embodiments, the blending proportion of the alpha blending method are equal between the shot image taken by the on-vehicle camera whose optical axis heads toward the area lighted by lighting apparatuses and the shot image taken by the on-vehicle camera whose optical axis does not head toward the area lighted by lighting apparatuses, in the area BA1 and the area 13A2. However, in the case where lighting apparatuses are on, the blending proportion for the shot image taken by the on-vehicle camera whose optical axis heads toward the area lighted by lighting apparatuses may be increased as compared to the case where lighting apparatuses are off. In an example, the proportion between the shot image taken by the on-vehicle camera whose optical axis heads toward the area lighted by lighting apparatuses and the shot image taken by the on-vehicle camera whose optical axis does not head toward the area lighted by lighting apparatuses can be set as 0.7:0.3. This method also can increase data volume of the shot image in proper brightness taken by the on-vehicle camera whose optical axis heads toward the area lighted by lighting apparatuses, and can decrease data volume of the shot image taken by the on-vehicle camera whose optical axis does not head toward the area lighted by lighting apparatuses. Thus, the method effectively reduces the problems of color migration occurring in the area BA1 and the area BA2 where the alpha blending method is adopted. As other methods of changing of the proportion, it is acceptable that the locations of the area BA1 and the area BA2 where the alpha blending method is adopted are the same as ones in FIG. 6, however, methods using different blending proportions also can be combined with the methods described in FIG. 9, FIG. 10, FIG. 11 or FIG. 13.

In the second embodiment, in the case where lighting apparatuses are on, the area BA1 and the area BA2 where the alpha blending method is adopted are narrowed as compared to the case where lighting apparatuses are not on, after moving the standard line CL1 and the standard line CL2. It is also acceptable that the area BA1 and the area BA2 where the alpha blending method is adopted can be narrowed with no move of the standard line CL1 and the standard line CL2. This also reduces effectively the problems of color migration occurring in the area BA1 and the area BA2 where the alpha blending method is adopted.

In the above embodiments, only the lighting of the headlights 98 and brake lights 99 are considered, in processing. Here, lighting modes of the lighting apparatuses other than the headlights 98 and brake lights 99, installed on the vehicle 9, may be considered.

In the above descriptions of the embodiments, the image generation apparatus 100 is separated from the navigation apparatus 20. Here, the image generation apparatus 100 and the navigation apparatus 20 may be integrated and may be installed in one box.

In the above descriptions of the embodiments, the navigation apparatus 20 functions as a display apparatus that displays images generated by the image generation apparatus 100. However, a normal display without special function such as navigation function also can be used.

Some of the functions that are described in the above embodiments as being performed by the controller 1 which is included in the image generation apparatus 100 may be performed by the controller 23 which is included in the navigation apparatus 20.

A part or all of the signals that are described in the above embodiments as being received by the signal receiver 41 may be received by the navigation apparatus 20. In this case, the navigation communicator 42 receives the signals that are received by the navigation apparatus 20, and inputs them to the controller 1 included in the image generation apparatus 100.

In the above descriptions of the embodiments, various functions are implemented through software, specifically by CPU processing based on programs. Here, some of these functions can be implemented through electrical hardware circuits. Contrarily, some of the functions implemented through hardware circuits in the above descriptions may be implemented through software.

While the invention has been shown and described in detail, the foregoing description is in all aspects illustrative and not restrictive. It is therefore understood that numerous other modifications and variations can be devised without departing from the scope of the invention.

What is claimed is:

1. An image generation apparatus that generates an image for display on a display installed in a vehicle, the image generation apparatus comprising:
    an image generator that generates a composite image showing a surrounding area of the vehicle viewed from virtual viewpoints, by combining a plurality of shot images taken by a plurality of on-vehicle cameras that are disposed at different locations on the vehicle;
    a receiver that receives a signal indicating a lighting mode of a lighting apparatus included in the vehicle; and
    a controller that changes data volumes of two shot images taken by two of the on-vehicle cameras based on the lighting mode of the lighting apparatus, the data volumes being used in an overlap area of the composite image that corresponds to the surrounding area of the vehicle where the two on-vehicle cameras can shoot in overlap, wherein
    the image generator generates at least a part of the overlap area of the composite image by blending the two shot images taken by the two on-vehicle cameras, and
    the controller increases the data volume of the shot image taken by a first on-vehicle camera of the two on-vehicle cameras that has an optical axis directed towards an area that is lighted by the lighting apparatus, and decreases the data volume of the shot image taken by a second on-vehicle camera of the two on-vehicle cameras, in a case where the lighting apparatus is on, as compared to a case where the lighting apparatus is off.

2. The image generation apparatus of claim 1, wherein the controller expands an area that uses the shot image taken by the first on-vehicle camera, and narrows an area that uses the shot image taken by the second on-vehicle camera, in the overlap area of the composite image, in the case where the lighting apparatus is on, as compared to the case where the lighting apparatus is off.

3. The image generation apparatus of claim 1, wherein the controller narrows an area where the shot image taken by the first on-vehicle camera and the shot image taken by the second on-vehicle camera are blended, in the case where the lighting apparatus is on, as compared to the case where the lighting apparatus is off.

4. The image generation apparatus of claim 1, wherein the controller increases a blending proportion of the shot image taken by the first on-vehicle camera in an area where the shot image taken by the first on-vehicle camera and the shot image taken by the second on-vehicle camera are blended, in the case where the lighting apparatus is on, as compared to the case where the lighting apparatus is off.

5. An image display system for installation in a vehicle, the image display system comprising:
    an image generator that generates a composite image showing a surrounding area of the vehicle viewed from virtual viewpoints, by combining a plurality of shot images taken by a plurality of on-vehicle cameras that are disposed at different locations on the vehicle;
    a receiver that receives a signal indicating a lighting mode of a lighting apparatus included in the vehicle;
    a controller that changes data volumes of two shot images taken by two of the on-vehicle cameras based on the lighting mode of the lighting apparatus, the data volumes being used in an overlap area of the composite image that corresponds to the surrounding area of the vehicle where the two on-vehicle cameras can shoot in overlap; and
    a display that displays the composite image generated by the image generator,
    the image generator generates at least a part of the overlap area of the composite image by blending the two shot images taken by the two on-vehicle cameras, and
    the controller increases the data volume of the shot image taken by a first on-vehicle camera of the two on-vehicle cameras that has an optical axis directed towards an area that is lighted by the lighting apparatus, and decreases the data volume of the shot image taken by a second on-vehicle camera of the two on-vehicle cameras, in a case where the lighting apparatus is on, as compared to a case where the lighting apparatus is off.

6. An image generation method for generating an image for display on a display installed in a vehicle, the image generation method comprising the steps of:
    (a) generating a composite image showing a surrounding area of the vehicle viewed from virtual viewpoints, by combining a plurality of shot images taken by a plurality of on-vehicle cameras that are disposed at different locations on the vehicle;
    (b) receiving a signal indicating a lighting mode of a lighting apparatus included in the vehicle; and
    (c) changing data volumes of two shot images taken by two of the on-vehicle cameras based on the lighting mode of the lighting apparatus, the data volumes being used in an overlap area of the composite image that corresponds to the surrounding area of the vehicle where the two on-vehicle cameras can shoot in overlap, wherein
    the step (a) generates at least a part of the overlap area of the composite image by blending the two shot images taken by the two on-vehicle cameras, and
    the step (c) increases the data volume of the shot image taken by a first on-vehicle camera of the two on-vehicle cameras that has an optical axis directed towards an area that is lighted by the lighting apparatus, and decreases the data volume of the shot image taken by a second on-vehicle camera of the two on-vehicle cameras, in a case where the lighting apparatus is on, as compared to a case where the lighting apparatus is off.

7. The image generation method of claim 6, wherein the step (c) expands an area that uses the shot image taken by the first on-vehicle camera, and narrows an area that uses the shot image taken by the second on-vehicle camera, in the overlap area of the composite image, in the case where the lighting apparatus is on, as compared to the case where the lighting apparatus is off.

8. The image generation method of claim 6, wherein
the step (c) narrows an area where the shot image taken by the first on-vehicle camera and the shot image taken by the second on-vehicle camera are blended, in the case where the lighting apparatus is on, as compared to the case where the lighting apparatus is off.

9. The image generation method of claim 6, wherein
the step (c) increases a blending proportion of the shot image taken by the first on-vehicle camera in an area where the shot image taken by the first on-vehicle camera and the shot image taken by the second on-vehicle camera are blended, in the case where the lighting apparatus is on, as compared to the case where the lighting apparatus is off.

* * * * *